United States Patent
Kim et al.

(10) Patent No.: US 9,745,922 B2
(45) Date of Patent: *Aug. 29, 2017

(54) APPARATUS AND METHOD FOR SUPPLYING FUEL TO ENGINE OF SHIP

(71) Applicant: DAEWOO SHIPBUILDING & MARINE ENGINEERING CO., LTD., Seoul (KR)

(72) Inventors: Nak Hyun Kim, Seongnam-si (KR); Dong Chan Kim, Busan (KR); Cheong Gi Park, Seoul (KR); Je Heon Jung, Seoul (KR)

(73) Assignee: DAEWOO SHIPBUILDING & MARINE ENGINEERING CO., LTD., Seoul (KR)

(*) Notice: Subject to any disclaimer, the term of this patent is extended or adjusted under 35 U.S.C. 154(b) by 217 days.

This patent is subject to a terminal disclaimer.

(21) Appl. No.: 14/659,484

(22) Filed: Mar. 16, 2015

(65) Prior Publication Data

US 2015/0184617 A1   Jul. 2, 2015

Related U.S. Application Data

(63) Continuation-in-part of application No. PCT/KR2015/000176, filed on Jan. 8, 2015, and a
(Continued)

(30) Foreign Application Priority Data

Sep. 17, 2013 (KR) .................. 10-2013-0112205
Nov. 7, 2013 (KR) .................. 10-2013-0134587
(Continued)

(51) Int. Cl.
*F02M 21/02* (2006.01)
*F17C 9/04* (2006.01)
(Continued)

(52) U.S. Cl.
CPC ..... *F02M 21/0245* (2013.01); *B63B 17/0027* (2013.01); *B63B 17/0036* (2013.01);
(Continued)

(58) Field of Classification Search
CPC .................................................. B63H 21/18
(Continued)

(56) References Cited

U.S. PATENT DOCUMENTS 4,285,195 A * 8/1981 Budzich ............... F15B 11/055
                                                   137/596
5,884,488 A * 3/1999 Gram .................... F04B 15/08
                                                   417/901
(Continued)

FOREIGN PATENT DOCUMENTS

JP      2012-177333 A    9/2012
KR  10-2003-0038393 A    5/2003
(Continued)

OTHER PUBLICATIONS

Korean Office Action dated Jun. 21, 2016 of corresponding Korean Patent Application No. 10-2014-0005117—5 pages.
(Continued)

*Primary Examiner* — Thomas E Lazo
(74) *Attorney, Agent, or Firm* — Knobbe Martens Olson & Bear LLP

(57) ABSTRACT

A system for supplying fuel to an engine of a ship. The system includes a high pressure pump pressurizing a liquefied natural gas (LNG) and supplying the pressurized LNG to the engine, a hydraulic motor driving the high pressure pump and a chamber carrying the high pressure pump and the hydraulic motor. The chamber is substantially free of electric sparks.

19 Claims, 16 Drawing Sheets

Related U.S. Application Data continuation-in-part of application No. 14/521,855, filed on Oct. 23, 2014, now Pat. No. 9,683,517, and a continuation-in-part of application No. PCT/KR2014/008660, filed on Sep. 17, 2014.

(30) Foreign Application Priority Data

| Jan. 9, 2014 | (KR) | ........................ 10-2014-0002877 |
|---|---|---|
| Jan. 15, 2014 | (KR) | ........................ 10-2014-0005117 |

(51) Int. Cl.

| F02M 31/18 | (2006.01) |
|---|---|
| F02D 41/00 | (2006.01) |
| B63B 17/00 | (2006.01) |
| B63H 21/38 | (2006.01) |
| B63B 43/00 | (2006.01) |
| B63H 21/14 | (2006.01) |
| F02M 31/16 | (2006.01) |
| F04B 23/04 | (2006.01) |
| F04B 53/18 | (2006.01) |
| F02D 19/06 | (2006.01) |
| F02M 59/10 | (2006.01) |

(52) U.S. Cl.
CPC ............ *B63B 43/00* (2013.01); *B63H 21/14* (2013.01); *B63H 21/38* (2013.01); *F02D 41/0027* (2013.01); *F02M 21/0215* (2013.01); *F02M 21/0221* (2013.01); *F02M 31/16* (2013.01); *F02M 31/18* (2013.01); *F04B 23/04* (2013.01); *F04B 53/18* (2013.01); *F17C 9/04* (2013.01); *F02D 19/0647* (2013.01); *F02D 19/0657* (2013.01); *F02M 59/105* (2013.01); *F17C 2221/033* (2013.01); *F17C 2225/01* (2013.01); *F17C 2225/035* (2013.01); *F17C 2227/0135* (2013.01); *Y02T 10/126* (2013.01); *Y02T 10/32* (2013.01); *Y02T 10/36* (2013.01); *Y02T 70/5218* (2013.01); *Y10T 137/86131* (2015.04)

(58) Field of Classification Search
USPC ................................... 440/88 F; 60/419, 450
See application file for complete search history.

(56) References Cited

U.S. PATENT DOCUMENTS

| 6,220,052 | B1* | 4/2001 | Tate, Jr. ................. F25J 1/0208 62/51.2 |
|---|---|---|---|
| 6,865,980 | B2* | 3/2005 | Jonninen ............... F03C 1/0431 60/456 |
| 7,497,180 | B2* | 3/2009 | Karlsson .................. B63J 99/00 114/74 R |
| 7,955,149 | B2* | 6/2011 | Levander ................ B63B 25/12 440/88 F |
| 8,043,136 | B2* | 10/2011 | Sipila ......................... B63J 2/00 440/88 F |
| 8,281,820 | B2* | 10/2012 | White ...................... F17C 5/02 141/37 |
| 8,591,273 | B2* | 11/2013 | Nylund ................... B63B 25/12 114/74 A |
| 9,151,248 | B2 | 10/2015 | Lee et al. |
| 2011/0057049 | A1* | 3/2011 | Hofbauer ............... F02M 53/02 239/5 |
| 2013/0269633 | A1* | 10/2013 | Bui ......................... B63H 21/12 123/3 |
| 2013/0312408 | A1* | 11/2013 | Murata .............. F02M 21/0215 60/605.1 |
| 2015/0121859 | A1 | 5/2015 | Kim et al. |
| 2015/0192093 | A1 | 7/2015 | Kim et al. |
| 2016/0052612 | A1 | 2/2016 | Kim et al. |

FOREIGN PATENT DOCUMENTS

| KR | 10-2008-0042928 A | 5/2008 |
|---|---|---|
| KR | 10-2009-0117553 A | 11/2009 |
| KR | 10-2011-0128080 A | 11/2011 |
| KR | 20-2012-0003585 U | 5/2012 |
| KR | 10-2012-0114265 A | 10/2012 |
| KR | 10-2012-0126755 A | 11/2012 |
| KR | 10-2013-0054345 A | 5/2013 |
| KR | 10-1277833 B1 | 6/2013 |

OTHER PUBLICATIONS

First Action Interview Pre-Interview Communication dated Jul. 8, 2015 of related U.S. Appl. No. 14/659,499—7 pages.
Office Action dated Oct. 15, 2014 of corresponding Korean Patent Application No. 10-2013-0134587—4 pages.
International Search Report dated Jan. 8, 2015 of PCT/KR2014/008660 which is the parent application—3 pages.

* cited by examiner

APPARATUS AND METHOD FOR SUPPLYING FUEL TO ENGINE OF SHIP

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to a system for supplying fuel to an engine of a ship.

Discussion of Related Technology

Generally, heavy oil, such as marine diesel oil (MDO), has been used as fuel for engines of ships to propel the ships. In the case of burning, the heavy oil would create serious environmental contamination due to various harmful materials included in the exhaust of the heavy oil. Thus, regulations for various engines of ships using the heavy oil as fuel requires various measures which increase the price of ships and costs for operating ships.

Therefore, proposed is the use of fuel gas, such as liquefied natural gas (LNG), liquefied petroleum gas (LPG), compressed natural gas (CNG), and di-methyl ether (DME) in engines of ships as replacement of the fuel oil. Further, in some instances, a ship includes both an engine that uses fuel oil and another engine that uses fuel gas, operating the engines alternately during its voyage while considering costs and exhaust regulations.

The foregoing discussion in this section is to provide general background information and does not constitute an admission of prior art.

SUMMARY

One aspect of the invention provides a ship, which may comprise: at least one fuel tank containing fuel; a fuel pump in fluid communication with the at least one fuel tank and configured to pressurize fuel from the at least one fuel tank to a pressure in a range from 150 bar absolute (bar(a)) to 400 bar(a); a heater in fluid communication with the fuel pump and configured to heat pressurized fuel from the fuel pump to a supercritical state of the fuel; a supercritical fuel engine in fluid communication with the heater and configured to consume the fuel from the heater in its supercritical state; a hydraulic pump configured to convert mechanical power into a pressurized flow of a hydraulic fluid; a hydraulic motor in fluid communication with the hydraulic pump and configured to convert the pressurized flow from the hydraulic pump into torque to power the fuel pump; hydraulic fluid conduits interconnecting the hydraulic pump and the hydraulic motor to form a closed loop of the hydraulic fluid; a fuel pump compartment enclosing the fuel pump and the hydraulic motor such that fuel from the at least one fuel tank is pressurized within the fuel pump compartment; a fuel processing compartment enclosing the heater such that the pressurized fuel travels from the fuel pump compartment to the fuel processing compartment and is heated within the fuel processing compartment; and a hydraulic pump compartment enclosing the hydraulic pump such that the hydraulic fluid is pressurized within the hydraulic pump compartment and sent to the fuel pump compartment; wherein the fuel pump compartment is air-tightly separated from the fuel processing compartment by at least one air-tight wall such that the fuel pump and the hydraulic motor are air-tightly isolated from the heater, wherein the fuel pump compartment is air-tightly separated from the hydraulic pump compartment by at least one air-tight wall such that the fuel pump and the hydraulic motor are air-tightly isolated from the hydraulic pump.

In the foregoing ship, the fuel pump compartment may comprise a first air inlet configured to receive air from outside the ship and a first air outlet configured to discharge air from the fuel pump compartment, wherein the air from the outside the ship is to enter the fuel pump compartment through the first air inlet without mixing with air from another compartment of the ship. The fuel processing compartment may comprise a second air inlet configured to receive air from outside the ship and a second air outlet configured to discharge air from the fuel processing compartment, wherein the air from the outside the ship is to enter the fuel processing compartment through the second air inlet without mixing with air from another compartment of the ship. The ship may further comprise: a first air intake conduit configured to receive air from outside the ship and transfer the air to the first air inlet; and a second air intake conduit configured to receive air from outside the ship and transfer the air to the second air inlet, wherein the first and second air intake conduits are separate from each other and are not interconnected. The ship may further comprise a first air discharge conduit configured to receive air from the first air outlet of the fuel pump compartment to outside the ship; a first leak detector configured to be exposed to the air discharged from the fuel pump compartment and to detect leakage of fuel within the fuel pump compartment; a second air discharge conduit configured to receive air from the second outlet of the fuel processing compartment outside the ship; and a second leak detector configured to be exposed to air discharged from the fuel processing compartment and to detect leakage of fuel within the fuel pump compartment.

Still in the foregoing ship, the fuel pump and the hydraulic motor enclosed in the fuel pump compartment may be built in an integrated body, wherein the fuel pump comprises a piston and a rotation-to-reciprocation converter configured to convert torque from the hydraulic motor to reciprocating motion of the piston. The heater may comprise a heat exchanger configured to heat the pressurized fuel from the fuel pump, wherein the hydraulic pump comprises an electric motor configured to generate mechanical energy to power pumping to generate the pressurized flow of hydraulic fluid.

Yet in the foregoing ship, the ship may comprise a hull and a deck placed over the hull, wherein the fuel processing compartment and the high-pressure pump compartment are located above the deck of the ship, wherein the hydraulic pump compartment is located under the deck. The ship may comprise a hull and a deck placed over the hull, wherein the fuel processing compartment and the fuel pump compartment are adjacent to each other and separated by the at least one wall without any intervening compartment or cofferdam between the fuel pump compartment and the fuel processing compartment, wherein a down-stream line from the fuel pump to the heater pass through the at least one wall. The ship may further comprise a cofferdam or another distinct compartment interposed between the fuel pump compartment and the hydraulic pump compartment, wherein the hydraulic fluid conduits pass through the cofferdam or the other distinct compartment. The ship may further comprise a cofferdam interposed between the fuel pump compartment and the hydraulic pump compartment, wherein the hydraulic fluid conduits does not pass through the cofferdam and instead goes around the cofferdam, wherein the fuel processing compartment and the fuel pump compartment are adjacent to each other and separated by the at least one wall only without any intervening compartment or cofferdam between the fuel pump compartment and the fuel processing compartment, wherein a down-stream line from the fuel pump to the heater does not pass through the at least one wall and instead goes around the at least one wall such that the down-stream line passes through another wall of the fuel pump compartment and another wall of the fuel processing compartment.

Further in the foregoing ship, the ship may further comprise: a vaporizer in fluid communication with the at least one fuel tank and configured to vaporize the fuel from the at least one fuel tank; and a vapor fuel engine in fluid communication with the vaporizer and configured to consume the fuel from the vaporizer in its vapor state, wherein the vaporizer is enclosed in the fuel processing compartment, wherein the fuel from the at least one fuel tank is transferred to the vaporizer without going through the fuel pump compartment. The ship may further comprise a mist separator in fluid communication with the vaporizer and configured to remove mists contained in the fuel from the vaporizer before the fuel is sent to the vapor fuel engine, wherein the vaporizer comprises a heat exchanger configured to heat the fuel from the at least one fuel tank to provide the vaporized state of the fuel, wherein the mist separator is also enclosed in the fuel processing compartment. The supercritical fuel engine may comprise an M-type Electronic Gas Injection (MEGI) engine, wherein the vapor fuel engine may comprise a dual-fuel diesel-electric (DFDE) engine.

Still further in the foregoing ship, the ship may further comprise a lubricant pump configured to pump lubricant to either or both of the fuel pump and the hydraulic motor enclosed in the fuel pump compartment, wherein the lubricant pump is enclosed in or outside the fuel pump compartment. The ship may further comprise: a lubricant pump configured to pump lubricant to either or both of the fuel pump and the hydraulic motor enclosed in the fuel pump compartment; a secondary hydraulic pump comprising an electric motor and configured to convert torque from the electric motor into a pressurized flow of a hydraulic fluid; and a secondary hydraulic motor in fluid communication with the secondary hydraulic pump and configured to convert the pressurized flow from the secondary hydraulic pump into torque to power the lubricant pump, wherein the lubricant pump is enclosed in the fuel pump compartment, wherein the secondary hydraulic pump is enclosed in the hydraulic pump compartment, wherein the secondary hydraulic motor is enclosed in the fuel pump compartment. The ship may further comprise: lubricant conduits in fluid communication with the hydraulic pump and configured to supply at least part of the fluid as lubricant to either or both of the fuel pump and the hydraulic motor, wherein the lubricant conduits pass through at least one air-tight wall; and a lubricant pump configured to pump the lubricant to send the lubricant to either or both of the fuel pump and the hydraulic motor enclosed in the fuel pump compartment, wherein the lubricant pump is located outside the fuel pump compartment.

Another aspect of the invention provides a ship, which may comprise: at least one fuel tank containing fuel; a fuel pump in fluid communication with the at least one fuel tank and configured to pressurize fuel from the at least one fuel tank to a pressure in a range from 150 bar absolute (bar(a)) to 400 bar(a); a heater in fluid communication with the fuel pump and configured to heat pressurized fuel from the fuel pump to a supercritical state of the fuel; a supercritical fuel engine in fluid communication with the heater and configured to consume the fuel from the heater in its supercritical state; at least one hydraulic pump configured to convert mechanical power into a pressurized flow of a hydraulic fluid; a first hydraulic motor in fluid communication with the at least one hydraulic pump and configured to convert the pressurized flow from the at least one hydraulic pump into torque to power the fuel pump; a lubricant pump configured to pump lubricant to either or both of the fuel pump and the hydraulic motor; a second hydraulic motor in fluid communication with the at least one hydraulic pump and configured to convert the pressurized flow from the at least one hydraulic pump into torque to power the lubricant pump; hydraulic fluid conduits interconnecting the at least one hydraulic pump and the first and second hydraulic motors; a fuel pump compartment comprising multiple air-tight walls and enclosing the fuel pump, the first hydraulic motor and the lubricant pump and the second hydraulic motor; and at least one hydraulic pump compartment enclosing the at least one hydraulic pump, wherein the fuel pump compartment is air-tightly separated from the at least one hydraulic pump compartment such that the fuel pump, the first hydraulic motor, the lubricant pump and the second hydraulic motor are air-tightly isolated from the at least one hydraulic pump.

In the foregoing ship, the at least one hydraulic pump may comprise a first hydraulic pump and a second hydraulic pump, which are enclosed in a single hydraulic pump compartment or in two separate hydraulic pump compartments, wherein the first hydraulic pump is in fluid communication with the first hydraulic motor via part of the hydraulic fluid conduits to form a first closed loop of hydraulic fluid, wherein the second hydraulic pump is in fluid communication with the second hydraulic motor via part of the hydraulic fluid conduits to form a second closed loop of hydraulic fluid. The at least one hydraulic pump may be a single hydraulic pump, wherein the at least one hydraulic pump compartment is a single hydraulic pump compartment, wherein the single hydraulic pump is in fluid communication with the first and second hydraulic motors via the hydraulic fluid conduits. The ship may further comprise lubricant conduits interconnecting between the lubricant pump and the fuel pump to form a closed loop of lubricant flow, wherein the lubricant conduits are enclosed in the fuel pump compartment. The ship may further comprise lubricant conduits interconnecting between the lubricant pump and the hydraulic motor to form a closed loop of lubricant flow, wherein the lubricant conduits are enclosed in the fuel pump compartment.

Still in the foregoing ship, the hydraulic fluid conduits may extend between the fuel pump compartment and the at least one hydraulic pump compartment through at least one of the multiple air-tight walls of the fuel pump compartment. The ship of may further comprise an electric motor configured to generate mechanical energy to power the at least one hydraulic pump for pumping of hydraulic fluid in the at least one hydraulic pump, wherein the electric motor is integrated with the at least one hydraulic pump and enclosed in the at least one hydraulic pump compartment. The fuel pump and the hydraulic motor enclosed in the fuel pump compartment may be built in an integrated body, wherein the lubricant pump configured to pump lubricant to the integrated body.

Yet in the foregoing ship, the ship may further comprise a hydraulic fluid container enclosed in the at least one hydraulic pump compartment and in fluid communication with the at least one hydraulic pump. The ship may further comprise a hydraulic fluid drain conduit interconnecting the first hydraulic motor and the hydraulic fluid container, wherein the hydraulic fluid drain conduit extends between the fuel pump compartment and the at least one hydraulic pump compartment. The supercritical fuel engine may comprise an M-type Electronic Gas Injection (MEGI) engine. The ship may further comprise a fuel processing compartment enclosing the heater such that the pressurized fuel travels from the fuel pump compartment to the fuel processing compartment and is heated within the fuel processing compartment, wherein the fuel pump compartment is air-tightly separated from the fuel processing compartment by at least one air-tight wall such that the fuel pump and the first hydraulic motor are air-tightly isolated from the heater, Still another aspect of the invention provides a ship, which may comprise: at least one fuel tank containing fuel; a fuel pump in fluid communication with the at least one fuel tank and configured to pressurize fuel from the at least one fuel tank to a pressure in a range from 150 bar absolute (bar(a)) to 400 bar(a); a heater in fluid communication with the fuel pump and configured to heat pressurized fuel from the fuel pump to a supercritical state of the fuel; a supercritical fuel engine in fluid communication with the heater and configured to consume the fuel from the heater in its supercritical state; a hydraulic pump configured to convert mechanical power into a pressurized flow of a hydraulic fluid; a hydraulic motor in fluid communication with the hydraulic pump and configured to convert the pressurized flow from the hydraulic pump into torque to power the fuel pump; hydraulic fluid conduits interconnecting the hydraulic pump and the hydraulic motor to form a closed loop of the hydraulic fluid; a vaporizer in fluid communication with the at least one fuel tank and configured to vaporize the fuel from the at least one fuel tank; and a vapor fuel engine in fluid communication with the vaporizer and configured to consume the fuel from the vaporizer in its vapor state; a fuel pump compartment enclosing the fuel pump and the hydraulic motor; a fuel processing compartment enclosing the heater and the vaporizer; and wherein the fuel pump compartment and the fuel processing compartment are air-tightly separated by at least one partitioning wall therebetween such that the fuel pump is air-tightly isolated from the heater and the vaporizer.

In the foregoing ship, the fuel pump compartment may comprise a first air inlet configured to receive air from outside the ship and a first air outlet configured to discharge air from the fuel pump compartment, wherein the air from the outside the ship is to enter the fuel pump compartment through the first air inlet without mixing with air from another compartment of the ship. The fuel processing compartment may comprise a second air inlet configured to receive air from outside the ship and a second air outlet configured to discharge air from the fuel processing compartment, wherein the air from the outside the ship is to enter the fuel processing compartment through the second air inlet without mixing with air from another compartment of the ship. The ship may further comprise: a first air intake conduit configured to receive air from outside the ship and transfer the air to the first air inlet; and a second air intake conduit configured to receive air from outside the ship and transfer the air to the second air inlet, wherein the first and second air intake conduits are separate from each other and are not interconnected.

Still in the foregoing ship, the fuel pump compartment may comprise a first air inlet configured to receive air from outside the ship and a first air outlet configured to discharge air from the fuel pump compartment to outside the ship, wherein the air from the fuel pump compartment to the outside the ship is to be discharged to outside the ship without mixing with air from another compartment of the ship. The fuel processing compartment may comprise a second air inlet configured to receive air from outside the ship and a second air outlet configured to discharge air from the fuel processing compartment to outside the ship, wherein the air from the fuel processing compartment to the outside the ship is to be discharged to outside the ship without mixing with air from another compartment of the ship. The ship may further comprise: a first air discharge conduit configured to receive air from the first air outlet of the fuel pump compartment to outside the ship; a first leak detector configured to be exposed to the air discharged from the fuel pump compartment and to detect leakage of fuel within the fuel pump compartment; a second air discharge conduit configured to receive air from the second outlet of the fuel processing compartment outside the ship; and a second leak detector configured to be exposed to air discharged from the fuel processing compartment and to detect leakage of fuel within the fuel pump compartment. The first and second air discharge conduits may be separate from each other and are not interconnected such that the first leak detector detects the fuel included in air from the fuel pump compartment that is not mixed with air from the fuel processing compartment, and further such that the second leak detector detects the fuel included in air from the fuel processing compartment that is not mixed with air from the fuel pump compartment.

Yet in the foregoing ship, the ship may further comprise a hydraulic pump compartment enclosing the hydraulic pump, wherein the fuel pump compartment is separated from the hydraulic pump compartment by at least one air-tight wall such that the fuel pump and the hydraulic motor are air-tightly isolated from the hydraulic pump. The ship may further comprise an electric motor configured to generate mechanical energy to power the at least one hydraulic pump for pumping of hydraulic fluid in the at least one hydraulic pump, wherein the electric motor is integrated with the hydraulic pump and enclosed in the hydraulic pump compartment. The ship may further comprise a mist separator in fluid communication with the vaporizer and configured to remove mists contained in the fuel from the vaporizer before the fuel is sent to the vapor fuel engine, wherein the vaporizer comprises a heat exchanger configured to heat the fuel from the at least one fuel tank to provide the vaporized state of the fuel, wherein the mist separator is also enclosed in the fuel processing compartment.

Further in the foregoing ship, the heater may comprise a first heat exchanger configured to heat the pressurized fuel being transferred between the fuel pump and the supercritical fuel engine, wherein the vaporizer comprises a second heat exchanger configured to heat the fuel transferred from the at least one fuel tank to provide the vaporized state of the fuel, wherein the ship further comprises a heat medium flow circuit connected to the first and second heat exchangers, the heat medium flow circuit being configured to circulate a heat medium heated by heat originated from either or both of the supercritical fuel engine and the vapor fuel engine. The heat medium flow circuit may be enclosed in the fuel processing compartment, wherein the fuel pump is air-tightly isolated from the first and second heat exchangers and a heat transfer medium flow circuit. The supercritical fuel engine may comprise an M-type Electronic Gas Injection (MEGI) engine, wherein the vapor fuel engine comprises a dual-fuel diesel-electric (DFDE) engine or a gas turbine engine. The fuel in a vapor state being transferred from the vaporizer and the vapor fuel engine may have a pressure of about 6 bar(a)

to about 10 bar(a). The ship may comprise a hull and a deck placed over the hull, wherein the fuel processing compartment and the fuel pump compartment are located above the deck of the ship, wherein the hydraulic pump compartment is located under the deck.

A further aspect of the invention provides a ship, which may comprises: a fuel tank containing fuel; a fuel pump in fluid communication with the fuel tank and configured to pressurize fuel from the fuel tank to a pressure in a range from 150 bar absolute (bar(a)) to 400 bar(a); a heater in fluid communication with the fuel pump and to heat pressurized fuel from the fuel pump to a supercritical state of the fuel; a supercritical fuel engine in fluid communication with the heater and configured to consume the fuel from the heater in its supercritical state; a hydraulic pump configured to convert mechanical power into a pressurized flow of a hydraulic fluid; a hydraulic motor in fluid communication with the hydraulic pump and configured to convert the pressurized flow from the hydraulic pump into torque to power the fuel pump; hydraulic fluid conduits interconnecting the hydraulic pump and the hydraulic motor to form a closed loop of the hydraulic fluid; a fuel pump compartment air-tightly partitioned from one or more neighboring compartments by at least one partitioning wall, wherein the fuel pump and the hydraulic motor are enclosed in the fuel pump compartment and the heater and the hydraulic pump are not enclosed in the fuel pump compartment such that that the high-pressure pump is air-tightly isolated from the hydraulic pump.

The present disclosure relates to an apparatus and method for stably transferring an inflammable material on a marine structure, and more particularly, to an apparatus and method for transferring an inflammable material, which can stably transfer an inflammable material such as liquefied natural gas (LNG) using a hydraulic motor as a drive source for operating a compressor or a pump when transferring the inflammable material on a marine structure, thereby stably transferring the inflammable material without risk of explosion or fire.

Another aspect of the invention provides an apparatus and method for transferring an inflammable material on a marine structure, which can stably transfer an inflammable material such as liquefied natural gas (LNG) using a hydraulic motor as a drive source for operating a compressor or a pump when transferring the inflammable material on a marine structure, thereby stably transferring the inflammable material without risk of explosion or fire. The apparatus includes a pressurization unit placed in a danger zone and pressurizing the inflammable material to transfer the inflammable material in one direction; and a hydraulic motor driving the pressurization unit, wherein the hydraulic motor and the pressurization unit are placed together in the danger zone.

According to one aspect of the invention, an apparatus for transferring an inflammable material on a marine structure, which is used to transfer an inflammable material from one place to another place on the marine structure, includes: a pressurization unit pressurizing the inflammable material to transfer the inflammable material in one direction; and a hydraulic motor driving the pressurization unit, wherein the hydraulic motor and the pressurization unit are placed in the same place.

Supply of operating fluid to the hydraulic motor may be performed by a dedicated hydraulic pressure generator for the hydraulic motor. A hydraulic line may be disposed between the dedicated hydraulic pressure generator and the hydraulic motor to supply the operating fluid to the hydraulic motor therethrough. The dedicated hydraulic pressure generator may include two hydraulic pumps for redundancy. The pressurization unit may include a pump or a compressor.

The apparatus according to embodiments of the invention may further include a lubricant pump for supplying a lubricant to the hydraulic motor. The lubricant pump may be placed together with the hydraulic motor in the same space. The apparatus according to embodiments of the invention may further include a hydraulic motor for the lubricant pump to drive the lubricant pump. The lubricant pump and the hydraulic motor for the lubricant pump may be placed together with the hydraulic motor in the same space.

The lubricant may be supplied into the hydraulic motor through a lubricant supply line extending from the lubricant pump to the hydraulic motor and then returned to the lubricant pump through a lubricant return line extending from the hydraulic motor to the lubricant pump.

Supply of operating fluid to the hydraulic motor and the hydraulic motor for the lubricant pump may be performed by a dedicated hydraulic pressure generator. The dedicated hydraulic pressure generator may include: a first hydraulic pump for supplying the operating fluid to the hydraulic motor; a second hydraulic pump for supplying the operating fluid to the hydraulic motor for the lubricant pump; and a reservoir capable of storing the operating fluid.

The operating fluid stored in the reservoir may be supplied to the hydraulic motor through a first supply line after being compressed by the first hydraulic pump and then returned to the reservoir through a first return line, and may be supplied to the hydraulic motor for the lubricant pump through a second supply line after being compressed by the second hydraulic pump and then returned to the reservoir through a second return line.

The apparatus according to embodiments of the invention may further include a first drain line to discharge the entirety of the operating fluid from the hydraulic motor for maintenance and overhaul of the hydraulic motor.

The apparatus according to embodiments of the invention may further include: a lubricant pump for supplying a lubricant to the hydraulic motor; a hydraulic motor for the lubricant pump for driving the lubricant pump; and a second drain line to discharge the entirety of the operating fluid from the hydraulic motor for the lubricant pump for maintenance and overhaul of the hydraulic motor for the lubricant pump.

The operating fluid used for driving the hydraulic motor may be used as a lubricant supplied for lubrication of the hydraulic motor. Supply of the operating oil to the hydraulic motor and supply of the lubricant to the hydraulic motor may be performed by the dedicated hydraulic pressure generator. The dedicated hydraulic pressure generator may include a first hydraulic pump for supplying the operating fluid to the hydraulic motor, a second hydraulic pump for supplying the lubricant to the hydraulic motor, and a reservoir capable of storing the operating fluid.

The operating fluid stored in the reservoir may be supplied to the hydraulic motor through a first supply line to operate the hydraulic motor after being compressed by the first hydraulic pump and then returned to the reservoir through a first return line, and may be supplied as a lubricant to the hydraulic motor through a second supply line after being compressed by the second hydraulic pump and then returned to the reservoir through a second return line.

The apparatus according to embodiments of the invention may further include: a first drain line to discharge the entirety of the operating fluid from the hydraulic motor for maintenance and overhaul of the hydraulic motor, and a lubricant drain line to discharge the entirety of the lubricant from the hydraulic motor for maintenance and overhaul of the hydraulic motor.

According to one aspect of the invention, a method of transferring an inflammable material from one place to another place on a marine structure, includes: operating a hydraulic motor with a hydraulic pressure supplied from a hydraulic pressure generator; and operating a pressurization unit pressurizing the inflammable material through a drive shaft extending from the hydraulic motor to transfer the inflammable material in one direction, wherein the hydraulic motor and the pressurization unit are placed together in the same place.

Embodiments of the invention provide an apparatus for transferring an inflammable material, which employs a hydraulic motor not causing generation of electric sparks as a driving source for the transfer apparatus, and a method for transferring an inflammable material. As a result, the apparatus and method for transferring an inflammable material according to the embodiments of the invention can guarantee stable transfer of the inflammable material.

In addition, in the apparatus and method for transferring an inflammable material according to the embodiments of the invention, which employs the hydraulic motor, a pressurization unit for pressurizing an inflammable material and a drive unit for operating the pressurization unit, that is, the hydraulic motor, are placed in the same space, thereby facilitating axial alignment and providing advantages in terms of maintenance and space utilization, as compared with a transfer apparatus in which the pressurization unit and the drive unit are placed in different spaces.

Furthermore, in the apparatus and method for transferring an inflammable material according to the embodiments of the invention, the hydraulic motor having a smaller size than an electric motor is used instead of the electric motor, whereby the apparatus and method for transferring an inflammable material can be easily applied to a medium or small marine structure having a narrower installation space than a large marine structure.

The present disclosure further relates to a ship using a liquefied natural gas (LNG) as a fuel, and more particularly, to an apparatus and a method for supplying a fuel to an engine of a ship and an apparatus and a method for regulating a speed of a high pressure pump supplying LNG to an engine.

Another aspect of the invention provides an apparatus and a method for supplying a fuel to an engine of a ship. The apparatus for supplying a fuel to an engine of a ship includes: a high pressure pump pressurizing a liquefied natural gas (LNG) and supplying the pressurized LNG to the engine; a hydraulic motor driving the high pressure pump; and a lubricating pump supplying lubricating oil to the high pressure pump.

An aspect of the invention is to provide an apparatus for supplying a fuel to an engine of a ship capable of miniaturizing and lightening all devices for supplying a fuel to an engine and being installed in an explosion-proof zone without an additional device to supply power and lubricating oil to a high pressure pump, and a method for supplying a fuel to an engine of a ship using the same.

Another aspect of the invention is to provide an apparatus for regulating a speed of a high pressure pump capable of miniaturizing and lightening all devices supplying a fuel to an engine and being installed in an explosion-proof zone without an additional device, and a method for regulating a speed of a high pressure pump using the same.

According to an embodiment of the invention, there is provide an apparatus for supplying a fuel to an engine of a ship, including: a high pressure pump pressurizing a liquefied natural gas (LNG) and supplying the pressurized LNG to the engine; a hydraulic motor driving the high pressure pump; and a lubricating pump supplying lubricating oil to the high pressure pump.

The apparatus for supplying a fuel to an engine of a ship may further include first and second hydraulic power units supplying oil to the hydraulic motor, wherein the second hydraulic power unit is operated in the case in which the first hydraulic power unit is not operable.

The first hydraulic power unit may be connected to the hydraulic motor by a first hydraulic line on which a first shutdown valve is installed, the second hydraulic power unit may be connected to the hydraulic motor by a second hydraulic line on which a second shutdown valve is installed, and the first shutdown valve may be opened in the case in which the first hydraulic power unit is operated and the second shutdown valve may be opened in the case in which the second hydraulic power unit is operated.

The apparatus for supplying a fuel to an engine of a ship may further include a pressure gauge installed in the first hydraulic line and measuring a pressure of the first hydraulic line. The apparatus for supplying a fuel to an engine of a ship may further include a lubricating motor driving the lubricating pump. The apparatus for supplying a fuel to an engine of a ship may further include third and fourth hydraulic power units supplying oil to the lubricating motor, wherein the fourth hydraulic power unit is operated in the case in which the third hydraulic power unit is not operable.

The third hydraulic power unit may be connected to the lubricating motor by a third hydraulic line on which a third shutdown valve is installed, the fourth hydraulic power unit may be connected to the lubricating motor by a fourth hydraulic line on which a fourth shutdown valve is installed, and the third shutdown valve may be opened in the case in which the third hydraulic power unit is operated and the fourth shutdown valve may be opened in the case in which the fourth hydraulic power unit is operated.

The apparatus for supplying a fuel to an engine of a ship may further include a hydraulic power unit supplying oil to the hydraulic motor and the lubricating motor. The hydraulic power unit may be connected to the lubricating motor by a hydraulic line on which a pressure regulating valve is installed, and the pressure regulating valve may be a valve regulating an amount of oil supplied to the lubricating motor.

According to another embodiment of the invention, an apparatus for supplying a fuel to an engine of a ship, includes: a high pressure pump pressurizing an LNG and supplying the pressurized LNG to the engine; a hydraulic motor driving the high pressure pump; a first hydraulic power unit supplying oil to the hydraulic motor; and a second hydraulic power unit supplying oil to the hydraulic motor in the case in which the first hydraulic power unit is not operable.

The first hydraulic power unit may be connected to the hydraulic motor by a first hydraulic line on which a first shutdown valve is installed, the second hydraulic power unit may be connected to the hydraulic motor by a second hydraulic line on which a second shutdown valve is installed, and the first shutdown valve may be opened in the case in which the first hydraulic power unit is operated and the second shutdown valve may be opened in the case in which the second hydraulic power unit is operated. The apparatus for supplying a fuel to an engine of a ship may further include a pressure gauge installed in the first hydraulic line and measuring a pressure of the first hydraulic line.

According to still another embodiment of the invention, an apparatus for regulating a speed of a high pressure pump of a ship includes: a hydraulic motor driving the high pressure pump while regulating the speed of the high pressure pump; a hydraulic power unit including a fixed displacement type hydraulic pump and a reservoir storing oil therein and regulating an amount of oil supplied to the hydraulic motor to regulate the speed of the hydraulic motor; and a recirculation valve allowing a portion of the oil transferred from the reservoir by the fixed displacement type hydraulic pump to again flow to the reservoir.

The recirculation valve may be installed inside the hydraulic power unit. The recirculation valve may be installed outside the hydraulic power unit. The high pressure pump may pressurize an LNG and supply the pressurized LNG to an engine.

According to yet still another embodiment of the invention, a method for regulating a speed of a high pressure pump of a ship includes: transferring oil stored in a reservoir toward a hydraulic line connected to a hydraulic motor using a fixed displacement type hydraulic pump; regulating a recirculation valve installed on a hydraulic line branched from the hydraulic line to regulate an amount of oil supplied to the hydraulic motor, thereby regulating a speed of the hydraulic motor; and allowing the speed of the high pressure pump to be regulated depending on the regulation of the speed of the hydraulic motor.

The fixed displacement type hydraulic pump and the reservoir may be included in a hydraulic power unit, and the recirculation valve may be installed inside the hydraulic power unit. The fixed displacement type hydraulic pump and the reservoir may be included in a hydraulic power unit, and the recirculation valve may be installed outside the hydraulic power unit. The high pressure pump may pressurize an LNG and supply the pressurized LNG to an engine.

The present disclosure further relates to an apparatus for stably supplying fuel gas to an engine in a vessel, and more particularly, to a fuel gas supply apparatus in which, in a vessel having a high-pressure engine and a low-pressure engine, a high-pressure pump of a fuel gas supply system for supplying fuel gas to the high-pressure engine is disposed in a separate space, thereby minimizing an influence on the overall fuel gas supply system even upon leakage of the fuel gas.

Another aspect of the invention provides a fuel gas supply apparatus for supplying fuel gas to an engine disposed in a vessel. The fuel gas supply apparatus includes: a gas supply system provided to a gas supply line for supplying fuel gas to the engine; a pump and a gasification unit included in the gas supply system; and a partition wall partitioning a space in which the gas supply system is disposed into a first space and a second space, wherein at least part of the pump is disposed in the first space.

An aspect of the invention provides a fuel gas supply apparatus, in which a separate space is defined by a partition wall such that a pump, through which fuel gas such as LNG can leak during transfer in a vessel is disposed therein, thereby stably transferring the fuel gas without risk of explosion or fire.

In accordance with one aspect of the invention, a fuel gas supply apparatus for supplying fuel gas to an engine disposed in a vessel includes: a gas supply system provided to a gas supply line for supplying fuel gas to the engine; a pump and a gasification unit included in the gas supply system; and a partition wall partitioning a space in which the gas supply system is disposed into a first space and a second space, wherein at least part of the pump is disposed in the first space.

The pump and the gasification unit may be disposed together in the first space. The gasification unit may be disposed in the second space. The pump may include a pumping unit pressurizing and discharging an introduced fuel gas, a drive unit driving the pumping unit, and a connecting shaft interconnecting the pumping unit and the drive unit to transmit power therebetween. The pumping unit may be disposed in the first space and the drive unit may be disposed in the second space. The connecting shaft may connect the pumping unit and the drive unit through a bearing disposed in the partition wall. The gasification unit may be arranged together with the drive unit in the second space.

The engine may include a low-pressure engine requiring a lower fuel supply pressure and a high-pressure engine requiring a higher fuel supply pressure. The gas supply line may include a low-pressure gas supply line for supplying fuel gas to the low-pressure engine and a low-pressure gas supply line for supplying fuel gas to the high-pressure engine. The gas supply system may include a low-pressure gas supply system provided to the low-pressure gas supply line and a high-pressure gas supply system provided to the high-pressure gas supply line. The pump may be a high-pressure pump that is included in the high-pressure gas supply system to pressurize the fuel gas to a fuel supply pressure required for the high-pressure engine. The gasification unit may include a low-pressure gasification unit included in the low-pressure gas supply system and a high-pressure gasification unit included in the high-pressure gas supply system.

The low-pressure gasification unit of the low-pressure gas supply system may be disposed in the second space, and the high-pressure pump and the high-pressure gasification unit of the high-pressure gas supply system may be disposed in the first space. The low-pressure gasification unit of the low-pressure gas supply system and the high-pressure gasification unit of the high-pressure gas supply system may be disposed in the second space and the high-pressure pump of the high-pressure gas supply system may be disposed in the first space.

Embodiments of the invention provide a fuel gas supply apparatus, in which a separate space is defined by a partition wall such that a pump, through which fuel gas such as LNG can leak during transfer in a vessel, can be disposed therein.

According to the embodiments of the invention, it is possible to stably transfer fuel gas without risk of explosion or fire. In addition, as the pump is disposed in the separate space, even though fuel gas leaks through a sealing portion of the pump, other facilities disposed in the vessel to supply fuel gas are not affected by the leaked fuel gas and thus, products of a low explosion proof grade can be used for the facilities disposed in the separate space from the pump.

BRIEF DESCRIPTION OF THE DRAWINGS

FIG. 4 is a view showing an example of a combustible material transferring apparatus driven by a hydraulic motor according to an embodiment of the invention; and FIG. 5 is a view showing another example of a combustible material transferring apparatus driven by a hydraulic motor according to an embodiment of the invention.

DETAILED DESCRIPTION OF EMBODIMENTS

Figure 1:
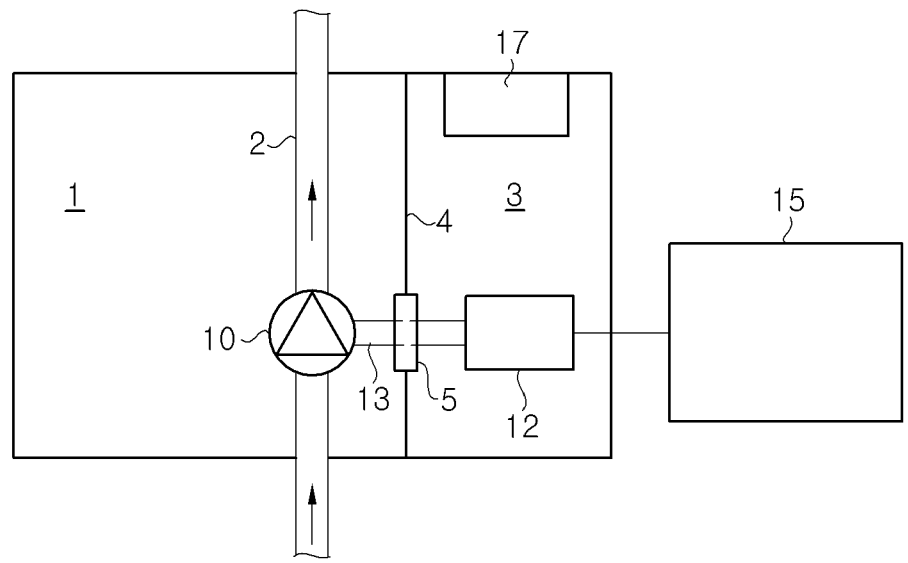
FIG. 1 is a diagram of an apparatus for transferring an inflammable material, which is driven by an electric motor.

Various embodiments are discussed below in detail.

Generally, in recent years, the use of liquefied natural gas (LNG) or liquefied petroleum gas (LPG) has rapidly expanded throughout the world. Liquefied gas is transported in a gaseous state through onshore or offshore gas pipelines, or transported to a remote consumption site while being stored in a liquefied state inside a liquefied gas carrier. Liquefied gas, such as LNG or LPG, is obtained by cooling natural gas or petroleum gas to cryogenic temperatures (in the case of LNG, about −163° C.). Since the volume of liquefied gas is considerably reduced as compared to a gaseous state, liquefied gas is suitable for long-distance marine transportation.

A liquefied gas carrier is designed to load liquefied gas, sail across the sea, and unload the liquefied gas at an onshore consumption site. To this end, the liquefied gas carrier includes a storage tank (also called a "cargo hold") that can withstand cryogenic temperatures of liquefied gas.

Examples of a marine structure provided with a storage tank capable of storing cryogenic liquefied gas may include vessels, such as a liquefied gas carrier and an LNG re-gasification vessel (LNG RV), or plants such as an LNG floating storage and re-gasification unit (LNG FSRU), an LNG floating, production, storage and off-loading (LNG FPSO) unit, and a barge mounted power plant (BMPP).

An LNG RV is a self-propelled, floating liquefied natural gas carrier equipped with an LNG re-gasification facility. An LNG FSRU is a marine structure that stores LNG unloaded from an LNG carrier on the sea far away from the land and, if necessary, supplies the LNG to an onshore consumption site by gasifying the LNG, and an LNG FPSO unit is a marine structure that refines extracted LNG at sea, stores the LNG in a storage tank after direct liquefaction, and, if necessary, transships the LNG to an LNG carrier. A BMPP is a structure that produces electricity at sea using a power plant mounted on a barge.

Herein, "vessel" or "marine structure" includes off-shore plants, such as an LNG FPSO, an Oil FPSO, an LNG FSRU, and a BMPP, as well as a liquefied gas carrier and an LNG RV.

Since LNG is inflammable, a region where LNG is likely to be introduced is designated as a danger zone in a marine structure or vessel transporting or using LNG. In the danger zone, explosion proof facilities are used to prevent explosion or fire in the case of possible introduction of liquefied natural gas.

In particular, when heavy fuel oil or marine diesel oil (MDO) used as a fuel of an engine in a vessel is combusted, serious environmental pollution is caused by harmful materials contained in exhaust gas. Therefore, restrictions on an engine of a vessel that uses oil as a fuel, such as heavy fuel oil, are being increased and costs required for satisfying the restrictions are increasingly rising.

Accordingly, engines using a clean fuel gas, such as LNG, LPG, CNG, or DME are developed and installed in various marine structures or vessels, and replace engines using heavy fuel oil or MDO as a fuel.

However, a clean fuel gas, such as LNG, is inflammable and, when used as a fuel in an engine for propulsion or power generation, needs to be consistently supplied to the engine during operation of a marine structure. Therefore, stability and safety of inflammable material transfer facilities would become important.

By the way, the International Maritime Organization (IMO) regulates the emission of nitrogen oxides ($NO_x$) and sulfur oxides ($SO_x$) among exhaust gases of vessels and these days, also tries to regulate the emission of carbon dioxide ($CO_2$). Particularly, the issue of the regulation of nitrogen oxides ($NO_x$) and sulfur oxides ($SO_x$) was raised by the Prevention of Marine Pollution from Ships (MARPOL) protocol in 1997. After eight years, the protocol met requirements for effectuation and entered into force in May 2005. Currently, the regulation is in force as a compulsory provision.

Therefore, in order to meet such provisions, a variety of methods have been introduced to reduce the emission of nitrogen oxides ($NO_x$). As one of these methods, a high-pressure natural gas injection engine for a marine structure such as an LNG carrier, for example, an MEGI engine (M-type, Electronically-Controlled, Gas-Injection engine) has been developed and used. The MEGI engine is being spotlighted as a next-generation eco-friendly engine capable of reducing emission of carbon dioxide by 23% or more, nitrogen compounds by 80% or more, and sulfur compounds by 95% or more, as compared with a diesel engine having the same output.

Such an MEGI engine may be provided in plants or vessels such as an LNG carrier which transports LNG while storing the LNG in a storage tank capable of withstanding cryogenic temperatures. In this case, the MEGI engine uses natural gas as fuel and requires a high pressure of about 200 to 400 bara (absolute pressure) for gas supply, depending upon a load thereof.

The MEGI engine may be directly coupled to a propeller for propulsion and to this end, may be a two-stroke engine rotating at a low speed. That is, the MEGI engine is a low-speed two-stroke high-pressure natural gas injection engine.

As sued herein, a transfer apparatus may be provided to a fuel gas supply (FGS) system for supplying fuel gas to the MEGI engine.

As used herein, the term "marine structure" is a concept including plants, such as an LNG FPSO, an Oil FPSO, an LNG FSRU, and a BMPP, as well as vessels, such as a liquefied gas carrier, an LNG RV, and a container ship.

In addition, as used herein, the term "inflammable material" is a concept including a gas that is stored as cargo in a storage tank and supplied to an engine when necessary, as well as a gas that is stored in a fuel tank for fuel supply to various types of engines provided to a vessel for propulsion and power generation.

Further, as used herein, the term "space" means a zone divided by a partition wall, and the expression "placed in the same space" can be interpreted as meaning that at least two components are placed together in one zone divided by a partition wall.

FIG. 1 shows one embodiment of an apparatus for transferring an inflammable material such as LNG on a marine structure. The transfer apparatus shown in FIG. 1 employs an electric motor as a driving source.

Referring to FIG. 1, the transfer apparatus for transferring an inflammable material such as LNG or boil-off gas, and includes a pressurization unit 10 provided to a transfer pipe 2 in a pressurizing space (zone 0) 1 and pressurizing the inflammable material to transfer the inflammable material through the transfer pipe 2 in one direction, and an electric motor 12 placed in an adjacent space (zone 1) 3, which is adjacent the pressurizing space 1 designated as a danger zone due to risk of explosion and divided by a partition wall 4, and provided as a drive unit for operating the pressurization unit 10.

As used herein, the term "pressurizing space" means a space in which the pressurization unit 10 is placed to pressurize the inflammable material for transfer of the inflammable material, and the term "adjacent space" means a space near the "pressurizing space" with a partition wall interposed therebetween. The pressurizing space must be designated as a danger zone in which explosion is likely to occur due to leakage of the inflammable material from the pressurization unit.

As the pressurization unit 10, a pump may be used when transferring an inflammable liquid material such as LNG, and a compressor may be used when transferring an inflammable gaseous material such as boil-off gas (BOG).

As a pump room or a compressor room, the pressurizing space or room 1 is a zone in which explosion is likely to occur due to leakage of the inflammable material and thus installation of equipment using electricity that can cause spark generation is avoided.

On the other hand, as the drive unit for the pressurization unit, the electric motor may be an explosion-proof electric motor. However, even when the explosion-proof electric motor is used as the electric motor, the electric motor may be placed in another space excluding a space having a possibility of leakage of the inflammable material (that is, the pressurizing space 1) in order to secure safety.

Accordingly, the electric motor 12 operated by electricity may be placed in the adjacent space or room 3 that acts as a motor room divided from the pressurizing space 1 by the partition wall 4, and drive force of the electric motor 12 is transmitted to the pressurization unit 10 through a driving shaft 13 passing through the partition wall 4. Supply of electricity to the electric motor 12 may be achieved by a power generator 15 disposed (in a safety zone) outside the motor room.

A portion of the partition wall 4 through which the driving shaft 13 passes may be sealed by a sealing bearing member 5 to block inflow of the inflammable material therethrough.

In such a structure of the transfer apparatus of the inflammable material, the electric motor can be placed in a separate space divided from the pressurization unit by the partition wall, thereby enabling safe transfer of the inflammable material.

However, in the transfer apparatus as shown in FIG. 1, the pressurization unit 10 and the electric motor 12 are placed in separate spaces with the partition wall 4 interposed therebetween, and are connected to each other through the driving shaft 13, thereby requiring considerable time and endeavor for alignment of the driving shaft 13 upon installation of the pressurization unit 10 and the electric motor 12 in the corresponding spaces.

Moreover, the adjacent space 3, which adjoins the pressurizing space 1 having a possibility of leakage of the inflammable material, requires an exhaust device 17 in order to discharge the inflammable material in the event that the inflammable material leaks to the adjacent space, thereby causing deterioration in space utilization due to difficulty in size reduction of the adjacent space 3 provided as the motor room.

Next, the configuration and operation of transfer apparatuses according to embodiments of the invention will be described in more detail with reference to FIG. 2 and FIG. 3. It should be understood that the following embodiments may be modified in various ways and do not limit the scope of the invention.

Figure 2:
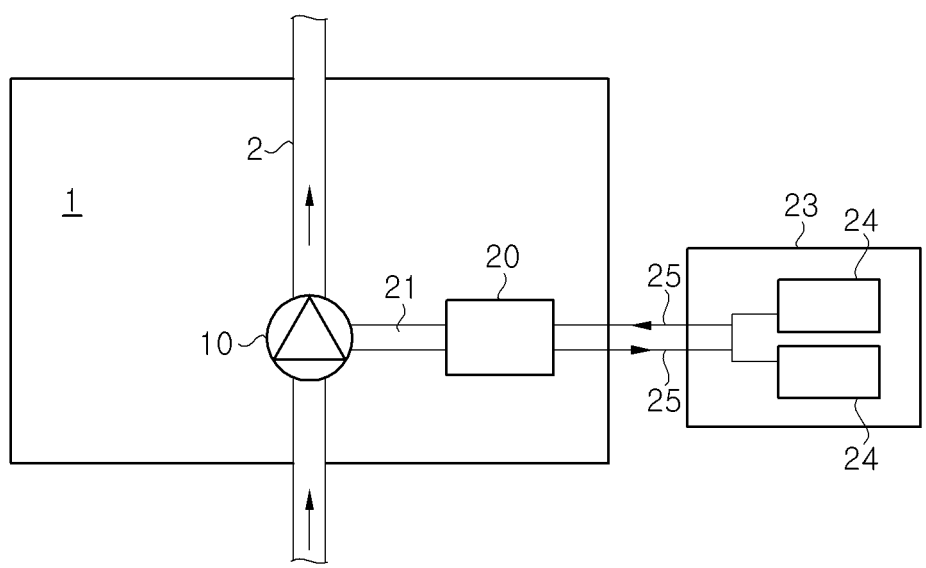
FIG. 2 is a diagram of an apparatus for transferring an inflammable material, which is driven by a hydraulic motor, according to an embodiment of the invention.

FIG. 2 is a diagram of an apparatus for transferring an inflammable material, which is driven by a hydraulic motor, according to an embodiment of the invention.

Referring to FIG. 2, an apparatus for transferring an inflammable material such as LNG or boil-off gas includes a pressurization unit 10 provided to a transfer pipe 2 in a pressurizing space (zone 0) 1 and pressurizing the inflammable material to transfer the inflammable material through the transfer pipe 2 in one direction, and a hydraulic motor 20 placed together with the pressurization unit 10 in the pressurizing space 1 and serving as a drive unit for operating the pressurization unit 10.

As the pressurization unit 10, a pump may be used when transferring an inflammable liquid material such as LNG, and a compressor may be used when transferring an inflammable gaseous material such as boil-off gas (BOG).

As a pump room or a compressor room, the pressurizing space 1 is a zone in which explosion is likely to occur due to leakage of the inflammable material and thus installation of equipment using electricity that can cause spark generation is avoided. However, the hydraulic motor 20 does not use electricity and thus can be provided to the pressurizing space 1.

In this way, the apparatus and method for transferring inflammable material according to embodiments of the invention employs the hydraulic motor instead of the electric motor 12 as the drive unit for operating the pressurization unit 10 such as the pump or the compressor disposed in the pressurizing space 1, thereby providing advantages in terms of maintenance and space utilization without installing the electric motor in the pressurizing space 1 in which explosion is likely to occur due to leakage of the inflammable material.

A driving shaft 21 is connected between the hydraulic motor 20 and the pressurization unit 10 to transmit drive force of the hydraulic motor 20 to the pressurization unit 10 therethrough.

Supply of operating fluid to the hydraulic motor 20 may be simply performed by a hydraulic pressure generator disposed inside the marine structure. According to this embodiment, however, the transfer apparatus may be provided with a dedicated hydraulic pressure generator 23 for driving the pressurization unit 10 of the inflammable material such that the operating fluid can be supplied to the hydraulic motor 20 through a hydraulic line 25 extending between the dedicated hydraulic pressure generator 23 and the hydraulic motor 20.

The dedicated hydraulic pressure generator 23 may include two hydraulic pumps 24 for redundancy.

The hydraulic motor 20 according to this embodiment may be a speed variable hydraulic motor. Use of the speed variable hydraulic motor eliminates a need for a separate speed reduction device and provides advantages in that the speed variable hydraulic motor occupies a small installation space and allows easy maintenance and overhaul, as compared with the electric motor that requires the reduction device such as a reduction gear and the like.

Figure 3:
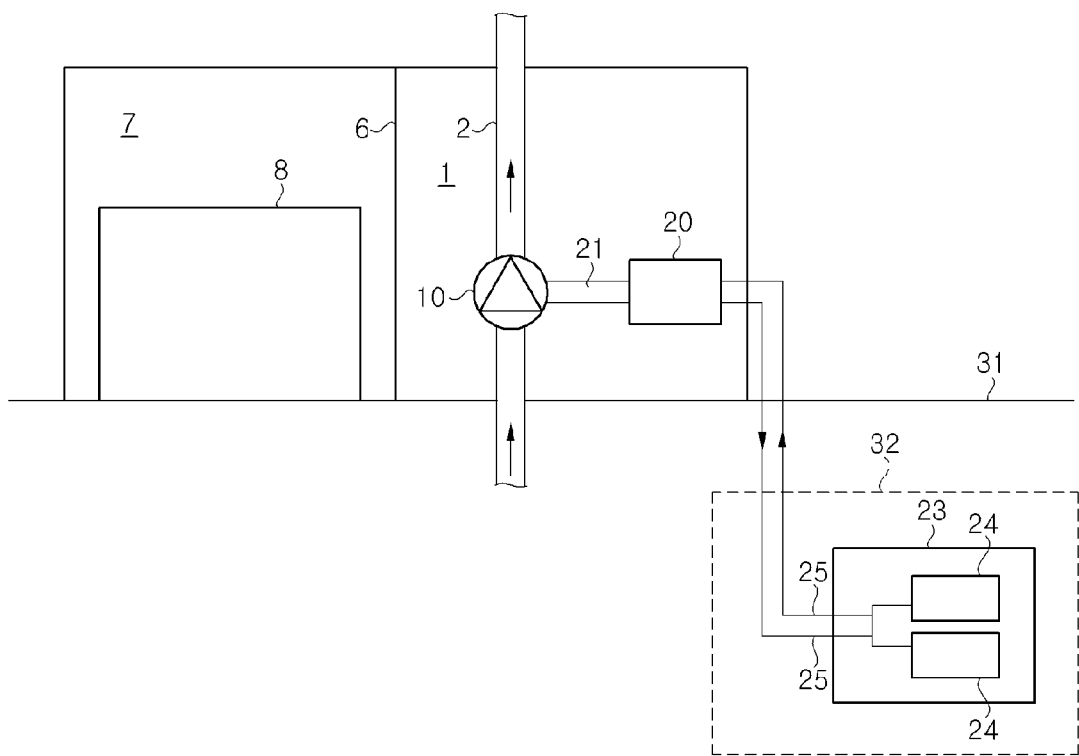
FIG. 3 is a diagram of an apparatus for transferring an inflammable material, which is driven by a hydraulic motor, according to an embodiment of the invention.

FIG. 3 is a diagram of an apparatus for transferring an inflammable material, which is driven by a hydraulic motor, according to an embodiment of the invention.

Like the transfer apparatus according to the embodiment of FIG. 2, the apparatus for transferring an inflammable material according to the embodiment shown in FIG. 3 includes a pressurization unit 10 provided to a transfer pipe 2 in a pressurizing space (zone 0) 1 and pressurizing the inflammable material to transfer the inflammable material through the transfer pipe 2 in one direction, and a hydraulic motor 20 placed together with the pressurization unit 10 in the pressurizing space 1 and serving as a drive unit for operating the pressurization unit 10.

As the pressurization unit 10, a pump may be used when transferring an inflammable liquid material such as LNG, and a compressor may be used when transferring an inflammable gaseous material such as boil-off gas (BOG).

According to this embodiment, the apparatus and method for transferring inflammable material employs the hydraulic motor instead of the electric motor 12 as the drive unit for operating the pressurization unit 10 such as the pump or the compressor disposed in the pressurizing space 1 used as a pump room or a compressor room, thereby providing advantages in terms of maintenance and space utilization without installing the electric motor in the pressurizing space 1.

Now, different features between the embodiment and the embodiment will be mainly described. In the following description, like components will be denoted by like reference numerals and detailed descriptions thereof will be omitted.

The apparatus for transferring an inflammable material according to the embodiment may further include a partition wall 6 that divides the pressurizing space 1 into at least two spaces. Among the two spaces divided by the partition wall 6, one space receiving the pressurization unit 10 must be treated as a danger zone in which explosion is likely to occur. Further, the other space opposite the space receiving the pressurization unit 10 with reference to the partition wall 6 may be treated as an adjacent space 7 near the pressurizing space 1 corresponding to the danger zone. In embodiment, the room 1 is gas-tightly separated from the room 7, and the partition wall 6 is a gas-tight wall to inhibit air or gas in the room 1 from flowing into the room 7 through the partition wall 6.

The adjacent space or room 7 may be provided with various devices 8 that cannot be disposed in the pressurizing space 1 due to risk of explosion. For example, the devices 8 placed in the adjacent space 7 include various devices associated with supply of fuel gas to engines, units for controlling such devices, and the like.

The apparatus for transferring an inflammable material according to this embodiment may be placed on a deck 31, and the hydraulic pressure generator 23 configured to supply the operating fluid to the hydraulic motor 20 may be disposed in an engine room (or machinery room) 32 under the deck 31. In embodiment, the room 1 is gas-tightly separated from the room 32, and the deck 31 includes a gas-tight wall structure, for example, a cofferdam, between the room 1 and the engine room 32 to inhibit the air or gas in the room 1 from flowing into the engine room 32.

In FIG. 3, the transfer pipe 2 extends upwards from a lower side of the deck 31 through the pressurizing space 1. However, it should be understood that this configuration is provided for illustration only and the invention is not limited to the extending directions of the transfer pipe 2 as shown in FIGS. 2 and 3.

Figure 4:
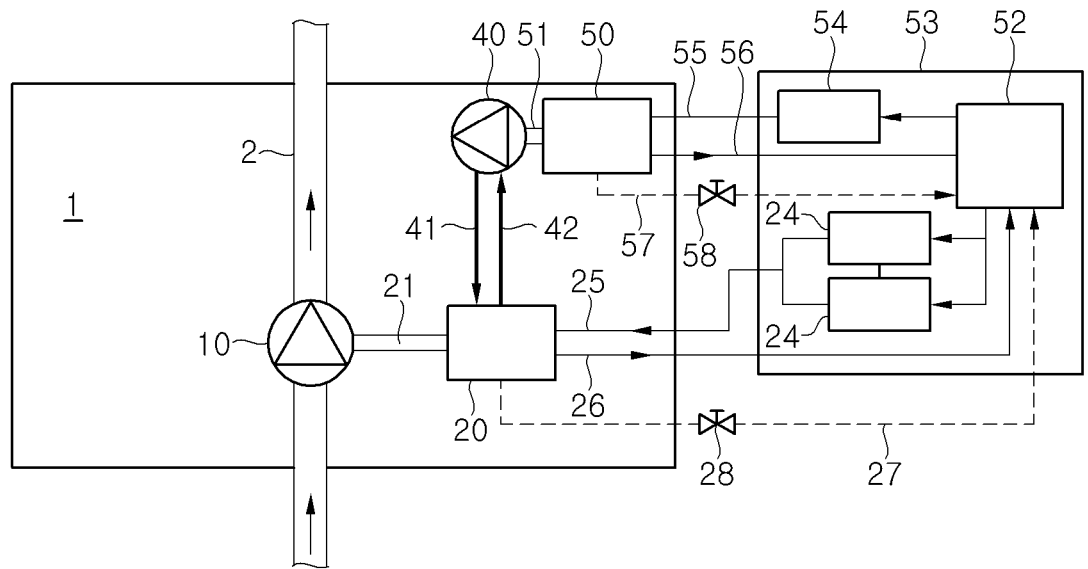
FIG. 4 is a diagram of an apparatus for transferring an inflammable material, which is driven by a hydraulic motor, according to an embodiment of the invention.

FIG. 4 is a diagram of an apparatus for transferring an inflammable material, which is driven by a hydraulic motor, according to an embodiment of the invention.

Like the transfer apparatus according to the embodiment of FIG. 2, the apparatus for transferring an inflammable material according to the embodiment shown in FIG. 4 includes a pressurization unit 10 provided to a transfer pipe 2 in a pressurizing space (zone 0) 1 and pressurizing the inflammable material to transfer the inflammable material through the transfer pipe 2 in one direction, and a hydraulic motor 20 placed together with the pressurization unit 10 in the pressurizing space 1 and serving as a drive unit for operating the pressurization unit 10.

As the pressurization unit 10, a pump may be used when transferring an inflammable liquid material such as LNG, and a compressor may be used when transferring an inflammable gaseous material such as boil-off gas (BOG).

As a pump room or a compressor room, the pressurizing space 1 is a zone in which explosion is likely to occur due to leakage of the inflammable material and thus installation of equipment using electricity that can cause spark generation is avoided. However, the hydraulic motor 20 does not use electricity and thus can be provided to the pressurizing space 1.

In this way, the apparatus and method for transferring inflammable material according to embodiments of the invention employs the hydraulic motor instead of the electric motor 12 as the drive unit for operating the pressurization unit 10 such as the pump or the compressor disposed in the pressurizing space 1, thereby providing advantages in terms of maintenance and space utilization without installing the electric motor in the pressurizing space 1 in which explosion is likely to occur due to leakage of the inflammable material.

A driving shaft 21 may be connected between the hydraulic motor 20 and the pressurization unit 10 to transmit drive force of the hydraulic motor 20 to the pressurization unit 10 therethrough.

Unlike the transfer apparatus according to the embodiment, the apparatus for transferring an inflammable material according to the embodiment shown in FIG. 4 further includes a lubricant pump 40 that supplies a lubricant to the hydraulic motor 20 disposed in the pressurizing space 1, and a hydraulic motor 50 for the lubricant pump that drives the lubricant pump 40 and is placed together with the hydraulic motor 20 in the pressurizing space 1.

In order to guarantee efficient driving of the hydraulic motor 20, there is a need for lubrication between respective components in motion. In addition, when the inflammable material is LNG, the LNG has a cryogenic temperature of about 163° C. at room temperature and affects the temperature of the pressurization unit 10 such that the temperature of the pressurization unit 10 is significantly lowered. As a result, the hydraulic motor 20 placed near the pressurization unit 10 and connected thereto by the driving shaft 21 can be also affected by low temperature. Since the viscosity of the lubricant increases at a low surrounding temperature, there can be a need for circulation of the lubricant due to insufficient lubrication.

In this embodiment, since the hydraulic motor 20 is connected to the pressurization unit 10, which pressurizes the inflammable material, through the driving shaft 21, a structure in which the lubricant is circulated is more advantageous than a structure in which the lubricant stagnates in the hydraulic motor 20. To this end, the lubricant pump 40 and the hydraulic motor 50 for the lubricant pump are respectively separated from the pressurization unit 10 and the hydraulic motor 20 within the pressurizing space 1.

As in the embodiment in which the driving shaft 21 is connected between the hydraulic motor 20 and the pressurization unit 10 to transmit drive force from the hydraulic motor 20 to the pressurization unit 10, a driving shaft 51 is connected between the hydraulic motor 50 and the lubricant pump 40 to transmit drive force from the hydraulic motor 50 to the lubricant pump 40.

For lubrication between the respective components of the hydraulic motor 20, a lubricant may be supplied into the hydraulic motor 20 through a lubricant supply line 41 extending from the lubricant pump 40 to the hydraulic motor 20, and then returned to the lubricant pump 40 through a lubricant return line 42 extending from the hydraulic motor 20 to the lubricant pump 40.

Supply of operating fluid to the hydraulic motor 20 and the hydraulic motor 50 for the lubricant pump may be simply performed by a hydraulic pressure generator disposed inside the marine structure. In addition, according to this embodiment, the transfer apparatus may be provided with a dedicated hydraulic pressure generator 53 for the hydraulic motor 20 for driving the pressurization unit 10 of the inflammable material and the hydraulic motor 50 for driving the lubricant pump 40 such that the operating fluid can be supplied to the hydraulic motor 20 and the hydraulic motor 50 for the lubricant pump.

The dedicated hydraulic pressure generator 53 includes a first hydraulic pump 24 that supplies the operating fluid to the hydraulic motor 20, a second hydraulic pump 54 that supplies the operating fluid to the hydraulic motor 50 for the lubricant pump, and a reservoir 52 capable of storing the operating fluid.

The dedicated hydraulic pressure generator 53 may include two first hydraulic pumps 24 having the same specifications and provided for redundancy.

The operating fluid stored in the reservoir 52 may be supplied to the hydraulic motor 20 through a first supply line 25 to operate the hydraulic motor 20 after being compressed by the first hydraulic pump 24, and then returned to the reservoir 52 through a first return line 26. As needed, some or the entirety of the operating fluid flowing towards the reservoir through the first return line 26 may be directly supplied to an upstream side of the first hydraulic motor 24 of the first supply line 25 without passing through the reservoir 52.

In addition, the operating fluid stored in the reservoir 52 may be supplied to the hydraulic motor 50 for the lubricant pump through a second supply line 55 to operate the hydraulic motor 50 for the lubricant pump after being compressed by the second hydraulic pump 54, and then returned to the reservoir 52 through a second return line 56. As needed, some or the entirety of the operating fluid flowing towards the reservoir 52 through the second return line 56 may be directly supplied to an upstream side of a second hydraulic motor 54 of the second supply line 55 without passing through the reservoir 52.

According to this embodiment, the apparatus for transferring an inflammable material may be provided with a first drain line 27 to discharge the entirety of the operating fluid from the hydraulic motor 20 for maintenance and overhaul of the hydraulic motor 20. The first drain line 27 may extend from the hydraulic motor 20, particularly from a lower end of the hydraulic motor 20, to the reservoir 52 or to the outside of the hydraulic pressure generator 53. The first drain line 27 is provided with a valve 28, which is opened to drain the operating fluid from the hydraulic motor 20 towards the reservoir 52 only upon drainage.

In addition, according to this embodiment, the apparatus for transferring an inflammable material may be provided with a second drain line 57 to discharge the entirety of the operating fluid from the hydraulic motor 50 for maintenance and overhaul thereof. The second drain line 57 may extend from the hydraulic motor 50 for the lubricant pump, particularly from a lower end of the hydraulic motor 50 for the lubricant pump, to the reservoir 52 or to the outside of the hydraulic pressure generator 53. The second drain line 57 is provided with a valve 58, which is opened to drain the operating fluid from the hydraulic motor 50 towards the reservoir 52 only upon drainage.

The hydraulic motor 20 and the hydraulic motor 50 for the lubricant pump according to this embodiment may be speed variable hydraulic motors. Use of the speed variable hydraulic motors eliminates a need for a separate speed reduction device and provides advantages in that the speed variable hydraulic motors occupy a small installation space and allow easy maintenance and overhaul, as compared with the electric motor that requires the reduction device such as a reduction gear and the like.

Figure 5:
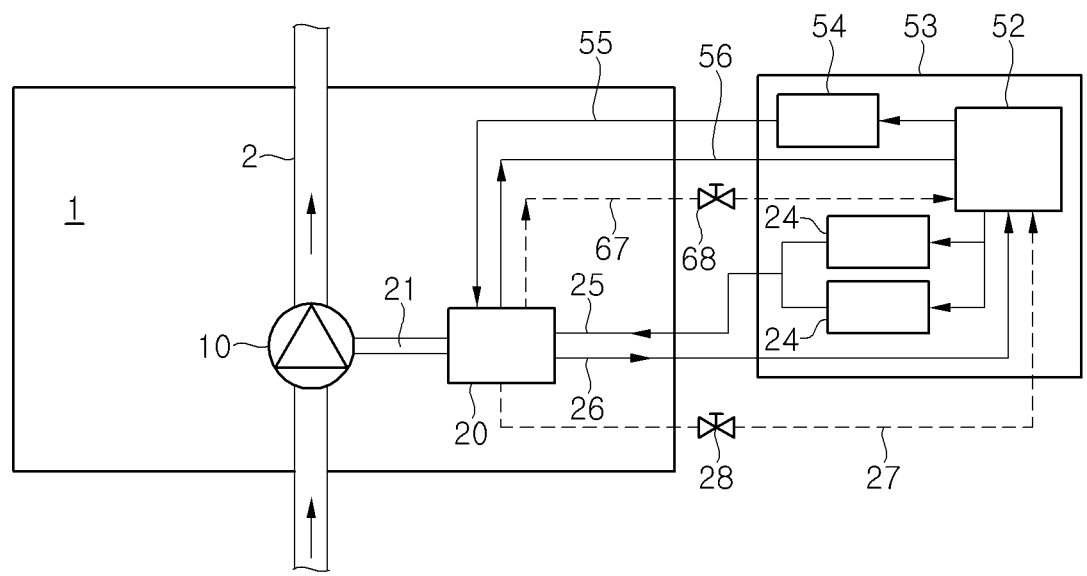
FIG. 5 is a diagram of an apparatus for transferring an inflammable material, which is driven by a hydraulic motor, according to an embodiment of the invention.

FIG. 5 is a diagram of an apparatus for transferring an inflammable material, which is driven by a hydraulic motor, according to an embodiment of the invention.

Like the transfer apparatus according to the embodiment of FIG. 4, the apparatus for transferring an inflammable material according to the embodiment shown in FIG. 5 includes a pressurization unit 10 provided to a transfer pipe 2 in a pressurizing space (zone 0) 1 and pressurizing the inflammable material to transfer the inflammable material through the transfer pipe 2 in one direction, and a hydraulic motor 20 placed together with the pressurization unit 10 in the pressurizing space 1 and serving as a drive unit for operating the pressurization unit 10.

As the pressurization unit 10, a pump may be used when transferring an inflammable liquid material such as LNG, and a compressor may be used when transferring an inflammable gaseous material such as boil-off gas (BOG).

As a pump room or a compressor room, the pressurizing space 1 is a zone in which explosion is likely to occur due to leakage of the inflammable material and thus installation of equipment using electricity that can cause spark generation is avoided. However, the hydraulic motor 20 does not use electricity and thus can be provided to the pressurizing space 1.

In this way, the apparatus and method for transferring inflammable material according to embodiments of the invention employs the hydraulic motor instead of the electric motor 12 as the drive unit for operating the pressurization unit 10 such as the pump or the compressor disposed in the pressurizing space 1, thereby providing advantages in terms of maintenance and space utilization without installing the electric motor in the pressurizing space 1 in which explosion is likely to occur due to leakage of the inflammable material.

A driving shaft 21 may be connected between the hydraulic motor 20 and the pressurization unit 10 to transmit drive force of the hydraulic motor 20 to the pressurization unit 10 therethrough.

Unlike the transfer apparatus according to the embodiment, the transfer apparatus according to the embodiment employs operating fluid, which can be used to drive the hydraulic motor 20, as a lubricant for the hydraulic motor 20. Accordingly, the transfer apparatus according to the embodiment does not require the lubricant pump 40 and the hydraulic motor 50 for the lubricant pump, which are used in the transfer apparatus according to the embodiment.

On the other hand, supply of the operating fluid to the hydraulic motor 20 may be simply performed by a hydraulic pressure generator disposed inside the marine structure. In addition, according to this embodiment, the transfer apparatus may be provided with a dedicated hydraulic pressure generator 53 for supply of a lubricant for the hydraulic motor 20 for driving the pressurization unit 10 of the inflammable material such that the operating fluid and the lubricant can be supplied to the hydraulic motor 20 by the dedicated hydraulic pressure generator 53.

The dedicated hydraulic pressure generator 53 includes a first hydraulic pump 24 that supplies the operating fluid to the hydraulic motor 20, a second hydraulic pump 54 that supplies the operating fluid as a lubricant to the hydraulic motor 20, and a reservoir 52 capable of storing the operating fluid.

The hydraulic pressure generator 53 may include two first hydraulic pumps 24 having the same specifications and provided for redundancy.

The operating fluid stored in the reservoir 52 may be supplied to the hydraulic motor 20 through a first supply line 25 to operate the hydraulic motor 20 after being compressed by the first hydraulic pump 24, and then returned to the reservoir 52 through a first return line 26. As needed, some or the entirety of the operating fluid flowing towards the reservoir 52 through the first return line 26 may be directly supplied to upstream of the first hydraulic motor 24 of the first supply line 25 without passing through the reservoir 52.

In addition, the operating fluid stored in the reservoir 52 may be supplied as a lubricant to the hydraulic motor 20 through a second supply line 55 to operate the hydraulic motor 20 after being compressed by the second hydraulic pump 54, and then returned to the reservoir 52 through a second return line 56. As needed, some or the entirety of the operating fluid flowing towards the reservoir 52 through the second return line 56 may be directly supplied to upstream of a second hydraulic motor 54 of the second supply line 55 without passing through the reservoir 52.

According to this embodiment, the apparatus for transferring an inflammable material may be provided with a first drain line 27 to discharge the entirety of the operating fluid from the hydraulic motor 20 for maintenance and overhaul of the hydraulic motor 20. The first drain line 27 may extend from the hydraulic motor 20, particularly from a lower end of the hydraulic motor 20, to the reservoir 52 or to the outside of the hydraulic pressure generator 53. The first drain line 27 is provided with a valve 28, which is opened to drain the operating fluid from the hydraulic motor 20 towards the reservoir 52 only upon drainage.

In addition, according to this embodiment, the apparatus for transferring an inflammable material may be provided with a lubricant drain line 67 to discharge the entirety of the lubricant from the hydraulic motor 20 for maintenance and overhaul of the hydraulic motor 20. The lubricant drain line 67 may extend from the hydraulic motor 20, particularly from a lubricant circulation unit inside the hydraulic motor 20, to the reservoir 52 or to the outside of the hydraulic pressure generator 53. The lubricant drain line 67 is provided with a valve 68, which is opened to drain the operating fluid used as the lubricant from the hydraulic motor 20 towards the reservoir 52 only upon drainage.

The hydraulic motor 20 according to this embodiment may be a speed variable hydraulic motor. Use of the speed variable hydraulic motor eliminates the need for a separate speed reduction device and provides advantages in that the speed variable hydraulic motor occupies a small installation space and allows easy maintenance and overhaul, as compared with the electric motor that requires the reduction device such as a reduction gear and the like.

With the structure as described above, the apparatus for transferring an inflammable material employs a hydraulic motor not causing generation of electric sparks as a driving source for the transfer apparatus, thereby guaranteeing stable transfer of the inflammable material without risk of explosion or a fire.

In addition, in the apparatus and method for transferring an inflammable material according to the invention, which employs the hydraulic motor, a pressurization unit for pressurizing an inflammable material and a drive unit for operating the pressurization unit, that is, the hydraulic motor, are placed in the same space, thereby facilitating axial alignment and providing advantages in terms of maintenance and space utilization, as compared with a transfer apparatus in which the pressurization unit and the drive unit are placed in different spaces.

Further, in the apparatus and method for transferring an inflammable material according to embodiments of the invention, the hydraulic motor having a smaller size than an electric motor is used instead of the electric motor, whereby the apparatus and method for transferring an inflammable material can be easily applied to a medium or small marine structure having a narrower installation space than a large marine structure.

Furthermore, when the apparatus and the method according to embodiments of the invention are applied to cargo vessels such as LNG carriers, container ships, and the like, the size of a space allocated to the apparatus for transferring an inflammable material can be significantly reduced, thereby allowing increase in cargo carrying capacity corresponding to reduction in the size of the space.

In the case of a main engine (MEGI) using the LNG as a fuel, a supply condition of high pressure (200 to 300 barg) has been demanded, and a high pressure pump and a high pressure vaporizer have been used in order to satisfy this condition.

In order to drive the high pressure pump, an electric motor or a hydraulic motor may be used. However, the United State Coast Guard (USCG) has defined a zone in which the high pressure pump is present as an explosion-proof zone to prohibit the electric motor from being used in this zone, and has defined so as to install a partition wall between the high pressure pump and the electric motor in order to use the electric motor. Therefore, in the case of using the electric motor, the partition wall should be separately installed. In addition, lubricating oil should be supplied to the high pressure pump in order to smoothly drive a driving part for a long period of time.

Meanwhile, in the case of the main engine, a fuel supply system that may be driven by the LNG at a low speed as well as at a high speed has been recently demanded, which means that a load of the engine may be significantly variably driven.

In terms of the fuel supply system, the system should be configured so as to variably satisfy a fuel supply amount by the load of the main engine. In order to supply the fuel so as to be in accord with an amount of fuel required by the engine, a speed of the high pressure pump should be regulated. The motor is installed in order to drive the high pressure pump. According to the related art, the electric motor and a variable frequency drive (VFD) are installed, and the VFD regulates a frequency supplied to the electric motor to regulate a speed of the electric motor.

However, the USCG has defined a zone in which the high pressure pump is present as an explosion-proof zone to prohibit the electric motor from being used in this zone, and has defined so as to install a partition wall between the high pressure pump and the electric motor in order to use the electric motor. Therefore, in the case of using the electric motor, the partition wall should be separately installed.

Generally, a nitrogen oxide (NOx) and a sulfur oxide (SOx) among waste gases drained from a ship have been regulated by the International Maritime Organization. Recently, discharge of a carbon dioxide has also been regulated. Particularly, the regulation for the nitrogen oxide (NOx) and the sulfur oxide (SOx) was imposed through a protocol of the prevention of marine pollution from ships (MARPOL) in 1997, and an effectuation requirement for the regulation for the nitrogen oxide (NOx) and the sulfur oxide (SOx) was satisfied in May, 2005, which is a time after a long time of eight years elapses, such that the regulation for the nitrogen oxide (NOx) and the sulfur oxide (SOx) has been currently effected as a compulsory rule.

Therefore, various methods for decreasing a drain amount of nitrogen oxide (NOx) have been introduced in order to satisfy the above-mentioned rule. Among them, a high pressure natural gas injection engine for a marine structure including a ship, or the like, such as a liquefied natural gas (LNG) carrier, for example, an MEGI engine has been developed and used. The MEGI engine has been prominent as the environment-friendly next generation engine that may decrease a drain amount of carbon dioxide, which is a pollutant, by 23% or more, a drain amount of nitrogen compound, which is a pollutant, by 80% or more, and a drain amount of sulfur compound, which is a pollutant, by 95% or more, as compared with a diesel engine having the same level of output.

The MEGI engine as described above may be installed in the ship such as the LNG carrier storing LNG in a storage tank enduring a very low temperature and carrying the LNG or the marine structure such as various plants, or the like. In this case, a natural gas is used as a fuel of an engine, and a high fuel gas supply pressure of about 200 to 400 bara (absolute pressure) is required in the engine depending on a load of the engine.

The MEGI engine may be used in a state in which it is directly connected to a propeller for propulsion. To this end, the MEGI engine is configured of a two-stroke engine rotated at a low speed. That is, the MEGI engine is a low speed two-stroke high pressure natural gas injection engine.

Since a zone in which a high pressure pump is present is an explosion-proof zone, it is dangerous to operate the high pressure pump using an electric motor. In addition, lubricating oil should be supplied to the high pressure pump in order to smoothly drive a driving part of the high pressure pump for a long period of time. Therefore, in an embodiment of the invention, the high pressure pump is driven using a hydraulic motor, and the lubricating oil is supplied to the high pressure pump using a lubricating motor and a lubricating pump.

Figure 6:
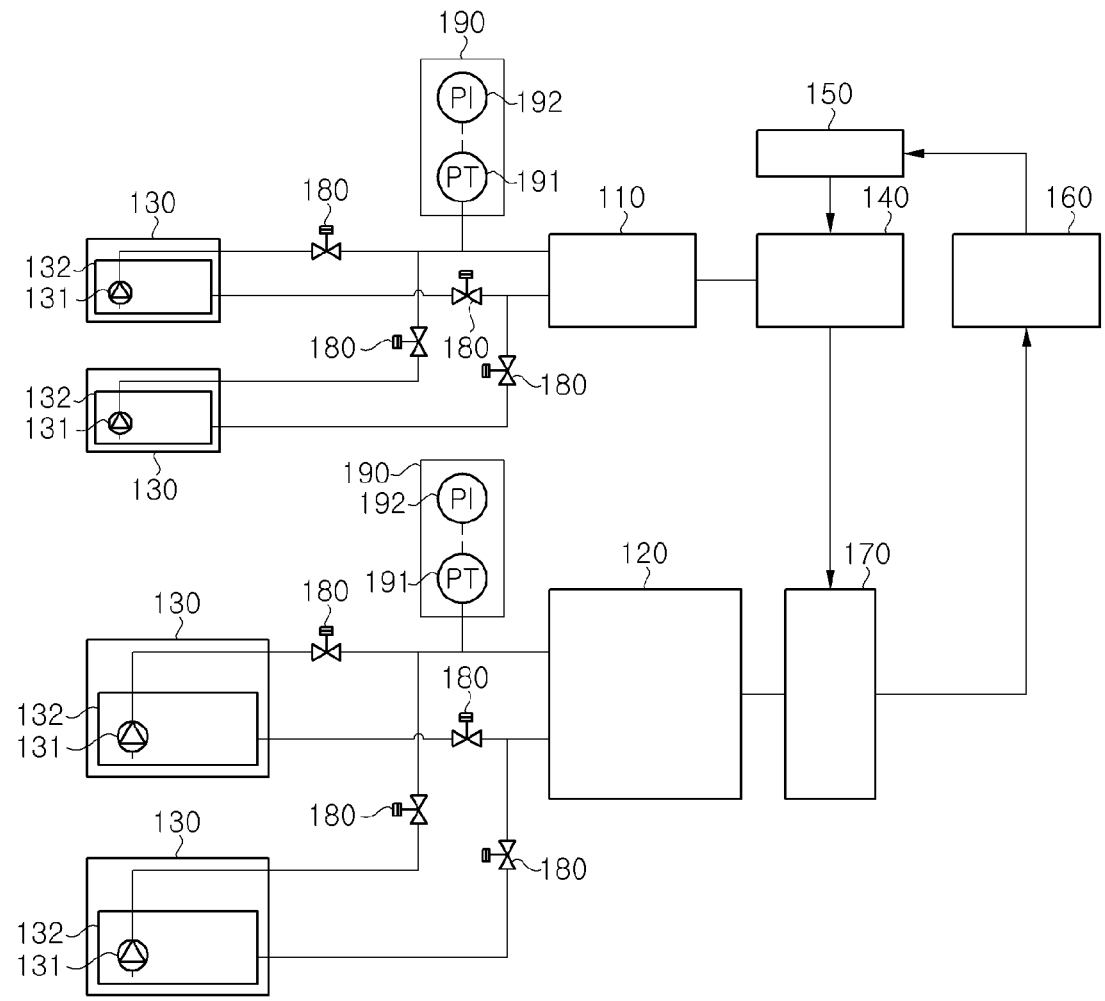
FIG. 6 is a view showing an example of an apparatus for supplying a fuel to an engine of a ship according to an embodiment of the invention.
Figure 7:
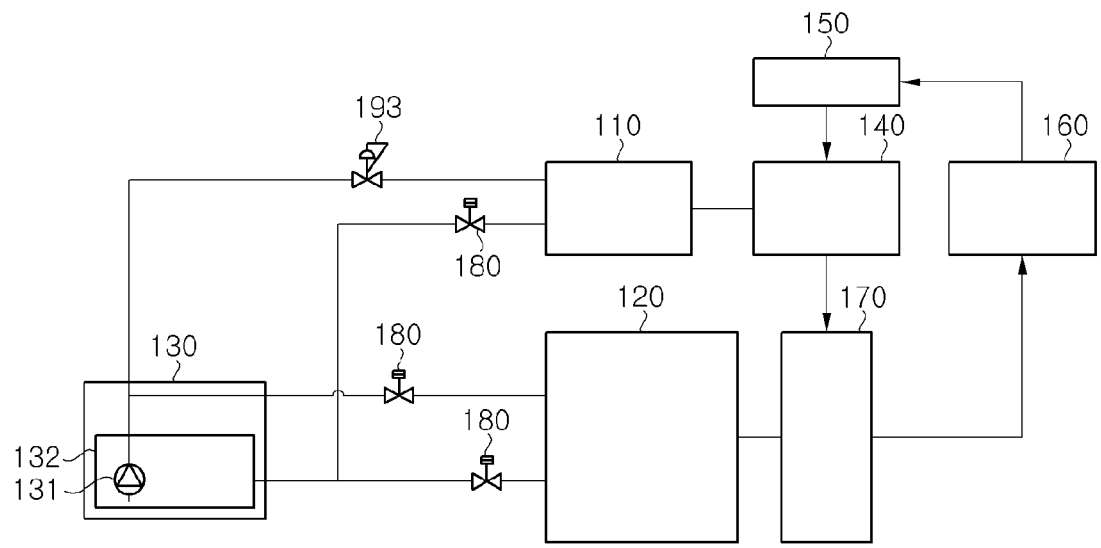
FIG. 7 is a view showing another example of an apparatus for supplying a fuel to an engine of a ship according to an embodiment of the invention.

FIG. 6 is a view showing an example of an apparatus for supplying a fuel to an engine of a ship according to an embodiment of the invention; and FIG. 7 is a view showing another example of an apparatus for supplying a fuel to an engine of a ship according to an embodiment of the invention.

As shown in FIGS. 6 and 7, the apparatus for supplying a fuel to an engine of a ship according to an embodiment of the invention is configured to include a high pressure pump 170 pressurizing a liquefied natural gas (LNG) and supplying the pressurized LNG to the engine, a hydraulic motor 120 driving the high pressure pump 170, a lubricating pump 140 supplying lubricating oil to the high pressure pump 170, and a lubricating motor 110 driving the lubricating pump 140.

The hydraulic motor 120 is connected to the high pressure pump 170 to drive the high pressure pump 170. A driving shaft is connected between the hydraulic motor 120 and the high pressure pump 170, and driving force of the hydraulic motor 120 may be transferred to the high pressure pump 170 through the driving shaft.

Since a zone in which the high pressure pump 170 is present is a danger zone in which the possibility of explosion is present, a device using electricity, which may cause a spark, may not be installed in the danger zone in order to secure safety. Therefore, in an embodiment of the invention, the hydraulic motor 120 rather than an electric motor is used as a driving apparatus of the high pressure pump 170, which is advantageous in terms of maintenance and space utilization without installing the electric motor in the danger zone.

A hydraulic power unit 130 is a device supplying oil to the hydraulic motor 120 in order to drive the hydraulic motor 120.

The hydraulic power unit 130 includes a hydraulic pump 131 and a reservoir 132. The reservoir 132 is a storage tank storing the oil therein. As shown in FIGS. 6 and 7, the hydraulic motor 120 and the reservoir 132 are connected to each other by a hydraulic line, and the hydraulic pump 131 is installed on the hydraulic line through which the oil flows from the reservoir 132 to the hydraulic motor 120. The hydraulic pump 131 supplies the oil stored in the reservoir 132 to the hydraulic motor 120, and the oil drives the hydraulic motor 120 and then flows again into the reservoir 132 through the hydraulic line.

The lubricating pump 140 supplies the lubricating oil to the high pressure pump 170. The lubricating pump 140 supplies the lubricating oil stored in a lubricating oil reservoir 150 to the high pressure pump 170, and since a temperature of the lubricating oil drained from the high pressure pump 170 rises, the lubricating oil drained from the high pressure pump 170 is cooled using a cold coolant in a cooler 160 and then enters again the lubricating oil reservoir 150.

The lubricating pump 140 is driven by the lubricating motor 110. A driving shaft connected between the lubricating motor 110 and the lubricating pump 140, and driving force of the lubricating motor 110 may be transferred to the lubricating pump 140 through the driving shaft.

The lubricating motor 110 is driven by the oil supplied thereto by the hydraulic power unit 130.

As shown in FIGS. 6 and 7, the lubricating motor 110 and the reservoir 132 of the hydraulic power unit 130 are connected to each other by a hydraulic line, and the hydraulic pump 131 is installed on the hydraulic line through which the oil flows from the reservoir 132 to the lubricating motor 110. The hydraulic pump 131 supplies the oil stored in the reservoir 132 to the lubricating motor 110, and the oil drives the lubricating motor 110 and then flows again into the reservoir 132 through the hydraulic line.

As shown in FIG. 6, each of the lubricating motor 110 and the hydraulic motor 120 may be connected to two hydraulic power units 130.

That is, since the hydraulic motor 120 is connected to the two hydraulic power units 130, in the case in which one of the two hydraulic power units 130 may not be operated due to a fault, or the like, the other of the two hydraulic power units 130 is operated to supply the oil to the hydraulic motor 120, such that the hydraulic motor 120 may be continuously operated normally.

In addition, since the lubricating motor 110 is also connected to the two hydraulic power units 130, in the case in which one of the two hydraulic power units 130 may not be operated due to a fault, or the like, the other of the two hydraulic power units 130 is operated to supply the oil to the lubricating motor 110, such that the lubricating motor 110 may be continuously operated normally.

As shown in FIG. 6, a shutdown valve 180 is installed on each of the hydraulic line connecting the hydraulic motor 120 and the hydraulic power unit 130 to each other and the hydraulic line connecting the lubricating motor 110 and the hydraulic power unit 130 to each other. When the hydraulic power unit 130 connected to the hydraulic line on which the corresponding shutdown valve 180 is installed is operated, the corresponding shutdown valve 180 is opened, and when the hydraulic power unit 130 connected to the hydraulic line on which the corresponding shutdown valve 180 is installed is not operated, the corresponding shutdown valve 180 is closed.

That is, in the case in which a first hydraulic power unit 130 and a second hydraulic power unit 130 are connected to the hydraulic motor 120, the shutdown valve 180 installed on the hydraulic line connected to the first hydraulic power unit 130 is opened during a period in which the first hydraulic power unit 130 is operated, and the shutdown valve 180 installed on the hydraulic line connected to the first hydraulic power unit 130 is closed and the shutdown valve 180 installed on the hydraulic line connected to the second hydraulic power unit 130 is opened when a fault occurs in the first hydraulic power unit 130, such that the second hydraulic power unit 130 is operated.

In addition, a pressure gauge 190 is installed on the hydraulic line to sense whether or not a fault has occurred in the hydraulic power unit 130. The pressure gauge 190 includes a pressure transmitter 191 and a pressure indicator 192. The pressure transmitter 191 measures a pressure of the hydraulic line and transmits the measured pressure to the pressure indicator 192, and the pressure indicator 192 indicates the received pressure. When the pressure indicated by the pressure gauge 190 exceeds a normal range, it is judged that a fault has occurred in the hydraulic power unit 130 that is in operation, the shutdown valve 180 installed on the hydraulic line connected to the hydraulic power unit 130 that is in operation is closed, and the shutdown valve 180 installed on the hydraulic line connected to the other hydraulic power unit 130 is opened, thereby making it possible to operate the other hydraulic power unit 130.

As shown in FIG. 7, the lubricating motor 110 and the hydraulic motor 120 may be connected to one hydraulic power unit 130. When the lubricating motor 110 and the hydraulic motor 120 receive the oil from one hydraulic power unit 130 as shown in FIG. 7, the number of installed hydraulic power units 130 is decreased, such that an additional device may be decreased, thereby making it possible to simplify a system configuration.

Here, since the lubricating motor 110 requires a smaller amount of oil than an amount of oil required by the hydraulic motor 120, a pressure regulating valve (PRV) 193 is installed on the hydraulic line connected to the lubricating motor 110 to regulate an amount of oil supplied to the lubricating motor.

Figure 8:
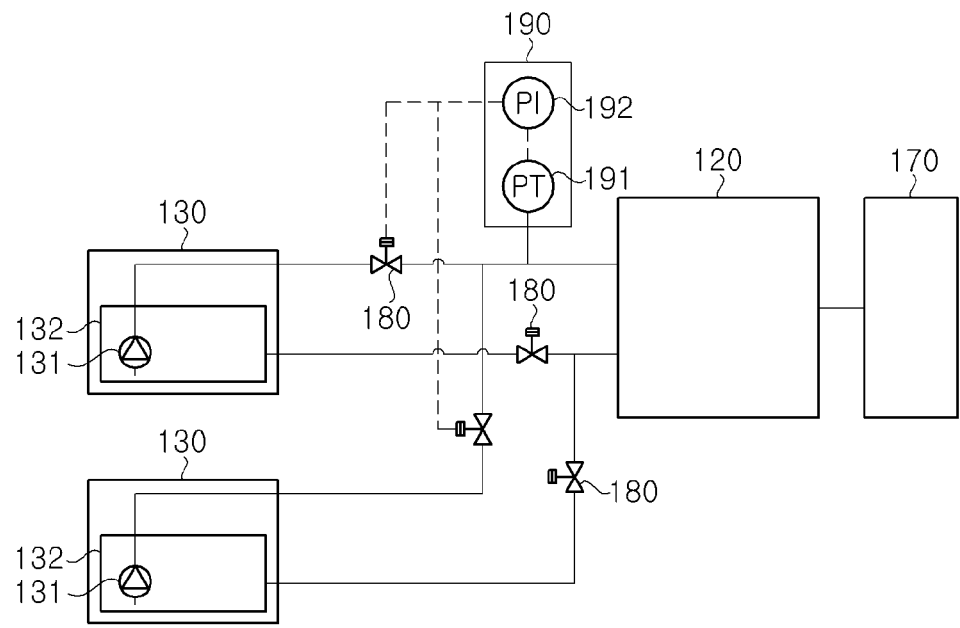
FIG. 8 is a view showing still another example of an apparatus for supplying a fuel to an engine of a ship according to an embodiment of the invention.

FIG. 8 is a view showing still another example of an apparatus for supplying a fuel to an engine of a ship according to an embodiment of the invention.

As shown in FIG. 8, the apparatus for supplying a fuel to an engine of a ship according to an embodiment of the invention is configured to include a high pressure pump 170 pressurizing an LNG and supplying the pressurized LNG to the engine, a hydraulic motor 120 driving the high pressure pump 170, and two hydraulic power units 130 supplying oil to the hydraulic motor 120.

The hydraulic motor 120 is connected to the high pressure pump 170 to drive the high pressure pump 170. A driving shaft is connected between the hydraulic motor 120 and the high pressure pump 170, and driving force of the hydraulic motor 120 may be transferred to the high pressure pump 170 through the driving shaft.

A hydraulic power unit 130 is a device supplying oil to the hydraulic motor 120 in order to drive the hydraulic motor 120.

The hydraulic power unit 130 includes a hydraulic pump 131 and a reservoir 132. The reservoir 132 is a storage tank storing the oil therein. As shown in FIG. 8, the hydraulic motor 120 and the reservoir 132 are connected to each other by a hydraulic line, and the hydraulic pump 131 is installed on the hydraulic line through which the oil flows from the reservoir 132 to the hydraulic motor 120. The hydraulic pump 131 supplies the oil stored in the reservoir 132 to the hydraulic motor 120, and the oil drives the hydraulic motor 120 and then flows again into the reservoir 132 through the hydraulic line.

As shown in FIG. 8, the hydraulic motor 120 may be connected to two hydraulic power units 130.

That is, since the hydraulic motor 120 is connected to the two hydraulic power units 130, in the case in which one of the two hydraulic power units 130 may not be operated due to a fault, or the like, the other of the two hydraulic power units 130 is operated to supply the oil to the hydraulic motor 120, such that the hydraulic motor 120 may be continuously operated normally.

As shown in FIG. 8, a shutdown valve 180 is installed on the hydraulic line connecting the hydraulic motor 120 and the hydraulic power unit 130 to each other. When the hydraulic power unit 130 connected to the hydraulic line on which the corresponding shutdown valve 180 is installed is operated, the corresponding shutdown valve 180 is opened, and when the hydraulic power unit 130 connected to the hydraulic line on which the corresponding shutdown valve 180 is installed is not operated, the corresponding shutdown valve 180 is closed.

That is, in the case in which a first hydraulic power unit 130 and a second hydraulic power unit 130 are connected to the hydraulic motor 120, the shutdown valve 180 installed on the hydraulic line connected to the first hydraulic power unit 130 is opened during a period in which the first hydraulic power unit 130 is operated, and the shutdown valve 180 installed on the hydraulic line connected to the first hydraulic power unit 130 is closed and the shutdown valve 180 installed on the hydraulic line connected to the second hydraulic power unit 130 is opened when a fault occurs in the first hydraulic power unit 130, such that the second hydraulic power unit 130 is operated.

In addition, a pressure gauge 190 is installed on the hydraulic line to sense whether or not a fault has occurred in the hydraulic power unit 130. When the pressure indicated by the pressure gauge 190 exceeds a normal range, it is judged that a fault has occurred in the hydraulic power unit 130 that is in operation, the shutdown valve 180 installed on the hydraulic line connected to the hydraulic power unit 130 that is in operation is closed, and the shutdown valve 180 installed on the hydraulic line connected to the other hydraulic power unit 130 is opened, thereby making it possible to operate the other hydraulic power unit 130.

Since a load of the MEGI engine is variable, a speed of the high pressure pump supplying the fuel to the engine should be regulated, and since a zone in which the high pressure pump is present is an explosion-proof zone, it is dangerous to operate the high pressure pump using an electric motor. Therefore, in an embodiment of the invention, a method for regulating a speed of a high pressure pump using a hydraulic motor is provided.

Figure 9:
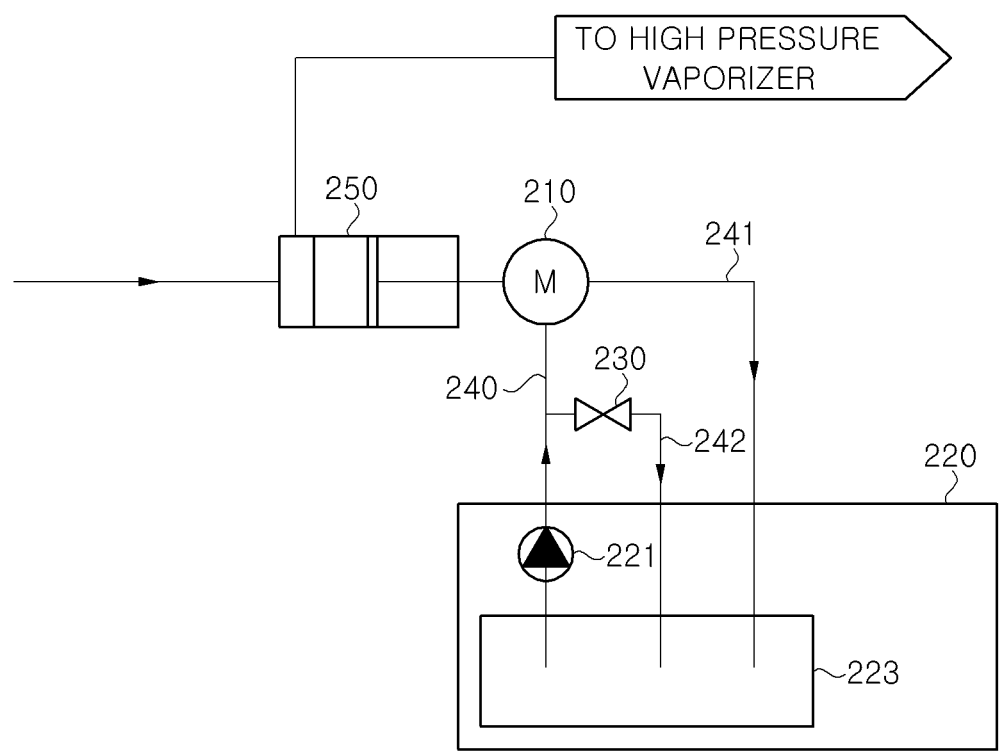
FIG. 9 is a view showing an example of an apparatus for regulating a speed of a high pressure pump of a ship according to an embodiment of the invention.
Figure 10:
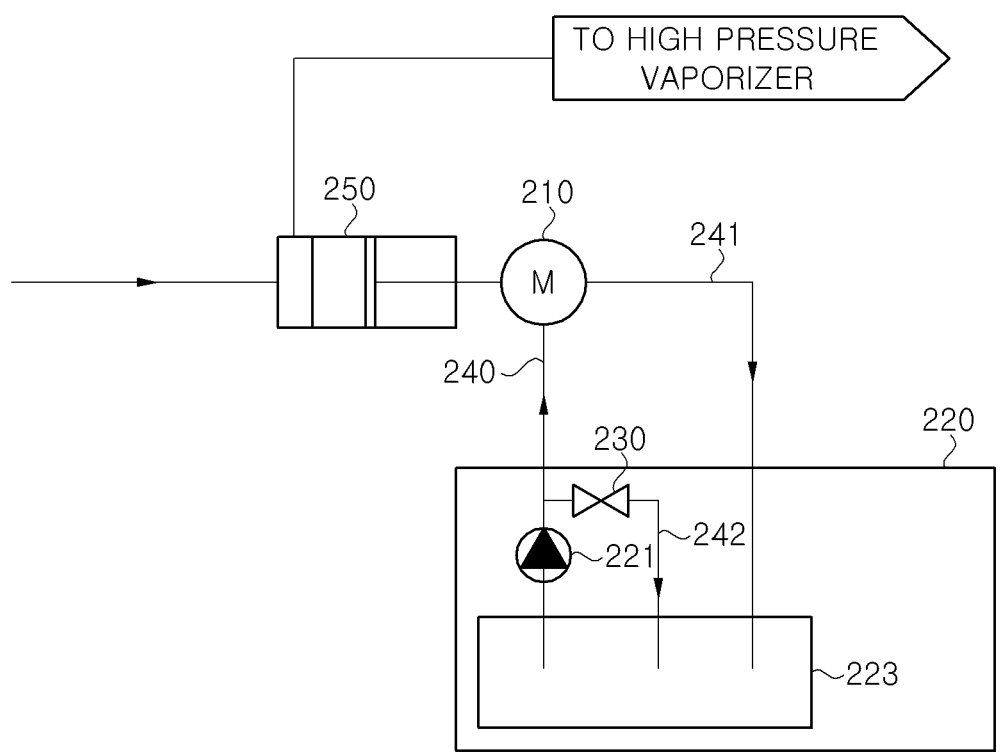
FIG. 10 is a view showing another example of an apparatus for regulating a speed of a high pressure pump of a ship according to an embodiment of the invention.

FIG. 9 is a view showing an example of an apparatus for regulating a speed of a high pressure pump of a ship according to an embodiment of the invention; FIG. 10 is a view showing another example of an apparatus for regulating a speed of a high pressure pump of a ship according to an embodiment of the invention; and FIG. 11 is a view showing still another example of an apparatus for regulating a speed of a high pressure pump of a ship according to an embodiment of the invention.

Figure 11:
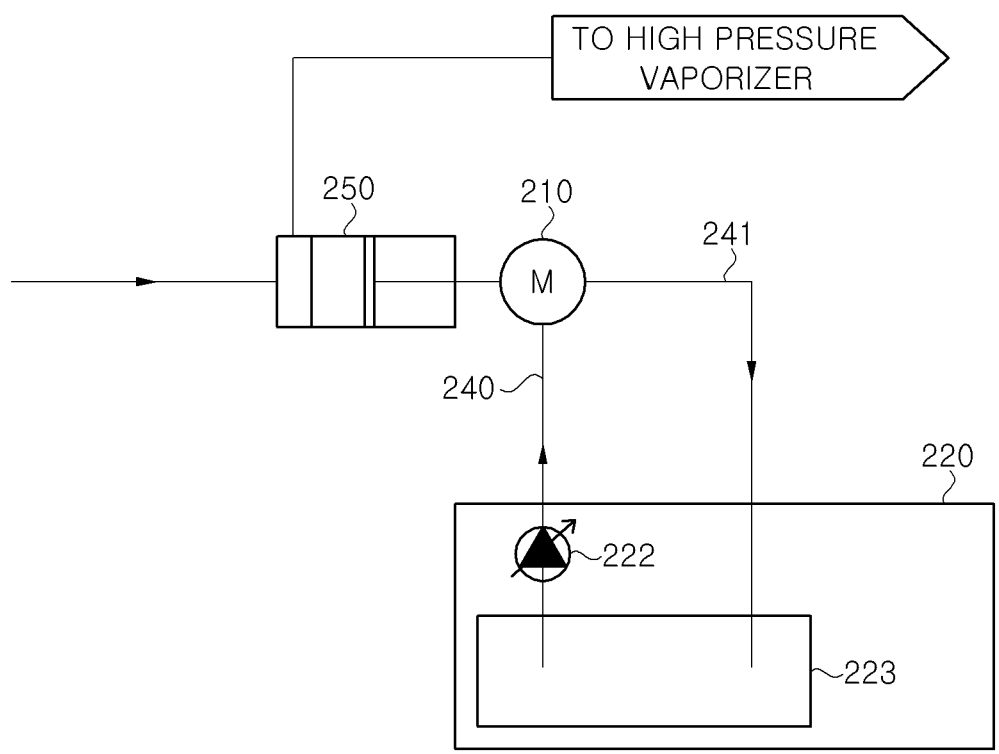
FIG. 11 is a view showing still another example of an apparatus for regulating a speed of a high pressure pump of a ship according to an embodiment of the invention.

As shown in FIGS. 9 to 11, the apparatus for regulating a speed of a high pressure pump of a ship according to an embodiment of the invention is configured to include a hydraulic motor 210 and a hydraulic power unit 220.

The hydraulic motor 210 is connected to the high pressure pump 250 to drive the high pressure pump 250 while regulating a speed of the high pressure pump 250. A driving shaft is connected between the hydraulic motor 210 and the high pressure pump 250, and driving force of the hydraulic motor 210 may be transferred to the high pressure pump 250 through the driving shaft.

The high pressure pump 250 supplies LNG to the engine through a high pressure vaporizer. However, since an amount of LNG required by the engine is variable, the speed of the high pressure pump 250 should be able to be regulated. Therefore, in an embodiment of the invention, a speed of the hydraulic motor 210 is regulated to regulate the speed of the high pressure pump 250.

Since a zone in which the high pressure pump 250 is present is a danger zone in which the possibility of explosion is present, a device using electricity, which may cause a spark, may not be installed in the danger zone in order to secure safety. Therefore, in an embodiment of the invention, the hydraulic motor 210 rather than an electric motor is used as a driving apparatus of the high pressure pump 250, which is advantageous in terms of maintenance and space utilization without installing the electric motor in the danger zone.

The hydraulic power unit 220, which is a device supplying the oil to the hydraulic motor 210 in order to drive the hydraulic motor 210, regulates an amount of oil supplied to the hydraulic motor 210 to regulate the speed of the hydraulic motor 210.

The hydraulic power unit 220 includes a hydraulic pump 221 or 222 and a reservoir 223. The reservoir 223 is a storage tank storing the oil therein. As shown in FIGS. 9 to 11, the hydraulic motor 210 and the reservoir 223 are connected to each other by hydraulic lines 240 and 241, and the hydraulic pump 221 or 222 is installed on the hydraulic line 240 through which the oil flows from the reservoir 223 to the hydraulic motor 210. The hydraulic pump 221 or 222 supplies the oil stored in the reservoir 223 to the hydraulic motor 210, and the oil drives the hydraulic motor 210 and then flows again into the reservoir 223 through the hydraulic line 241.

Here, in order to regulate the speed of the hydraulic motor 210, an amount of oil supplied to the hydraulic motor 210 should be regulated.

In FIGS. 9 and 10, a fixed displacement type hydraulic pump 221 is installed in the hydraulic power unit 220, and a hydraulic line 242 branched from the hydraulic line 240 through which the oil flows from the reservoir 223 to the hydraulic motor 210 and again connected to the reservoir and a recirculation valve 230 are installed. That is, the fixed displacement type hydraulic pump 221 continuously pumps a constant amount of oil, and the recirculation valve 230 is regulated to regulate an amount of oil supplied to the hydraulic motor 210. For example, when a speed of the hydraulic motor 210 is to be increased, the recirculation valve is closed to allow a large amount of oil to be supplied to the hydraulic motor 210, when a speed of the hydraulic motor 210 is to be decreased, the recirculation valve is opened to allow a large amount of oil to flow to the hydraulic line 242, thereby allowing a small amount of oil to be supplied to the hydraulic motor 210. Here, an opened degree of the valve is regulated, thereby making it possible to regulate an amount of oil supplied to the hydraulic motor 210.

FIG. 9 is a view showing the case in which the recirculation valve is installed outside the hydraulic power unit 220, and FIG. 10 is a view showing the case in which the recirculation valve is installed inside the hydraulic power unit 220.

In the case in which a worker uses the hydraulic power unit 220 that includes the fixed displacement type hydraulic pump 221 but does not have the recirculation valve installed therein, he/she separately installs the recirculation valve 230 outside the hydraulic power unit 220 as shown in FIG. 9, thereby making it possible to regulate an amount of oil supplied to the hydraulic motor 210.

Alternatively, the worker may use the hydraulic power unit 220 that includes the fixed displacement type hydraulic pump 221 and has the recirculation valve 230 installed therein, as shown in FIG. 10.

FIG. 11 shows the case in which the hydraulic power unit 220 includes a variable displacement type hydraulic pump 222. In FIG. 11, the variable displacement type hydraulic pump 222 is regulated to regulate an amount of oil pumped from the reservoir 223 by the variable displacement type hydraulic pump 222, thereby making it possible to regulate an amount of oil supplied to the hydraulic motor 210.

Figure 12:
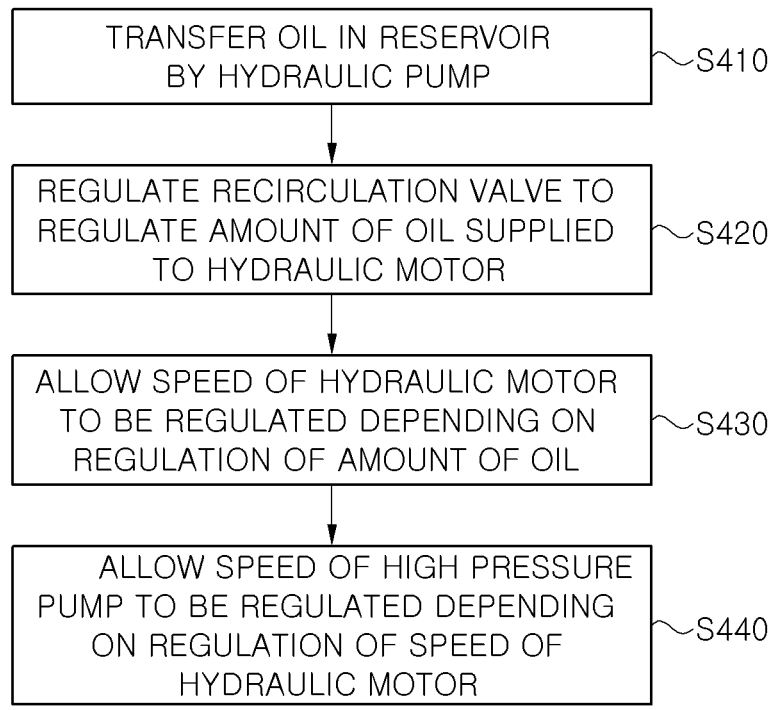
FIG. 12 is a flow chart showing an example of a method for regulating a speed of a high pressure pump of a ship according to an embodiment of the invention.
Figure 13:
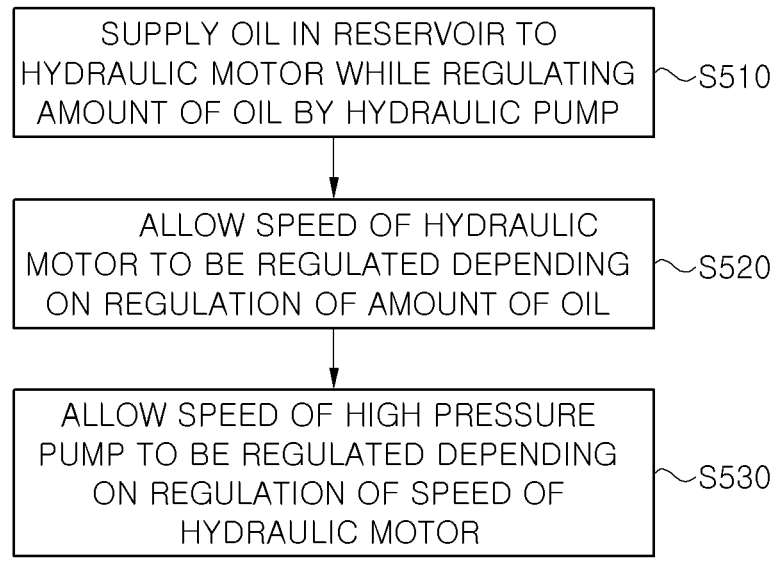
FIG. 13 is a flow chart showing another example of a method for regulating a speed of a high pressure pump of a ship according to an embodiment of the invention.

Next, a method for regulating a speed of a high pressure pump of a ship according to an embodiment of the invention will be described with reference to FIGS. 12 and 13. FIG. 12 is a flow chart showing an example of a method for regulating a speed of a high pressure pump of a ship according to an embodiment of the invention; and FIG. 13 is a flow chart showing another example of a method for regulating a speed of a high pressure pump of a ship according to an embodiment of the invention.

FIG. 12 shows a method for regulating a high pressure pump of a ship by the apparatus for regulating a speed of a high pressure pump of a ship shown in FIGS. 9 and 10.

As shown in FIG. 12, the oil in the reservoir 223 of the hydraulic power unit 220 is transferred toward the hydraulic line 240 by the hydraulic pump 221 (S410). Here, since the hydraulic pump 221 is the fixed displacement type hydraulic pump, it continuously transfers a constant amount of oil toward the hydraulic line 240.

Then, the recirculation valve 230 is regulated to regulate an amount of oil supplied to the hydraulic motor 210 (S420). Here, the recirculation valve 230 may be installed outside the hydraulic power unit 220 as shown in FIG. 9 or be installed inside the hydraulic power unit 220 as shown in FIG. 10. That is, the fixed displacement type hydraulic pump 221 continuously transfers a constant amount of oil, and the recirculation valve 230 is regulated to regulate an amount of oil supplied to the hydraulic motor 210. For example, when a speed of the hydraulic motor 210 is to be increased, the recirculation valve is closed to allow a large amount of oil to be supplied to the hydraulic motor 210, when a speed of the hydraulic motor 210 is to be decreased, the recirculation valve is opened to allow a small amount of oil to be supplied to the hydraulic motor 210. Here, an opened degree of the valve is regulated, thereby making it possible to regulate an amount of oil supplied to the hydraulic motor 210.

Then, a speed of the hydraulic motor 210 is regulated (S430) depending on the regulation of the amount of oil, a speed of the high pressure pump 250 is regulated (S440) depending on the regulation of the speed of the hydraulic motor 210.

FIG. 13 shows a method for regulating a high pressure pump of a ship by the apparatus for regulating a speed of a high pressure pump of a ship shown in FIG. 11.

As shown in FIG. 13, the oil in the reservoir is supplied to the hydraulic motor 210 while an amount of oil is regulated by the hydraulic pump 222 (S510). Here, since the hydraulic pump 222 is the variable displacement type hydraulic pump, it is regulated, thereby making it possible to regulate an amount of oil supplied to the hydraulic motor 210.

Then, a speed of the hydraulic motor 210 is regulated (S520) depending on the regulation of the amount of oil, a speed of the high pressure pump 250 is regulated (S530) depending on the regulation of the speed of the hydraulic motor 210.

Referring back to FIGS. 4 and 5, components of the combustible material transferring apparatus shown in FIGS. 4 and 5 can be combined to an apparatus for supplying a fuel to an engine shown in FIGS. 6 to 13.

FIG. 4 is a view showing an example of a combustible material transferring apparatus driven by a hydraulic motor according to an embodiment of the invention. The combustible material transferring apparatus according to an embodiment of the invention shown in FIG. 4 includes a pressurizing means 10 installed in a transferring pipe 2 within a pressurizing zone 1 and pressurizing a combustible material to transfer the combustible material in one direction within the transferring pipe 2 and a hydraulic motor 20, which is a driving means installed together with the pressurizing means 10 within the pressurizing zone 1 and driving the pressurizing means 10.

As the pressurizing means 10, a pump may be used in the case of transferring a combustible material in a liquid state, such as a LNG, and a compressor may be used in the case of transferring a combustible material in a gas state such as a natural gas (BOG).

Since the pressurizing zone 1, which is a pump room or a compressor room, is a zone in which the possibility of explosion is present due to leakage of the combustible material, a device using electricity, which may cause a spark, may not be installed in the pressurizing zone in order to secure safety. Since the hydraulic motor 20 does not use the electricity, it may be installed in the pressurizing zone 1.

As described above, the hydraulic motor is used instead of the electric motor as a driving means for driving the pressurizing means 10 such as the pump, the compressor, or the like, installed in the pressurizing zone 1, thereby making it possible to provide a combustible material transferring apparatus and method advantageous in terms of maintenance and space utilization without installing the electric motor in the pressurizing zone 1 in which the possibility of explosion is present due to the leakage of the combustible material.

A driving shaft 21 is connected between the hydraulic motor 20 and the pressurizing means 10, and driving force of the hydraulic motor 20 may be transferred to the pressurizing means 10 through the driving shaft 21.

In the combustible material transferring apparatus according to an embodiment of the invention shown in FIG. 4, a lubricating pump 40 supplying lubricating oil to the hydraulic motor 20 installed in the pressurizing zone 1 and a lubricating oil pump hydraulic motor 50 driving the lubricating oil pump 40 are installed together with the hydraulic motor 20 in the pressurizing zone 1.

In order to smoothly drive the hydraulic pump 20, lubrication between the respective components that are operated is required. In addition, since a temperature of the LNG, which is the combustible material, is a very low temperature of approximately −163° C. at a room temperature, a temperature of the pressurizing means 10 becomes very low. Therefore, the hydraulic motor 20 installed closely to the pressurizing means 10 and connected to the pressurizing means 10 through the driving shaft 21 may also be affected by the low temperature. In the case in which an ambient temperature is low, since viscosity of the lubricating oil is increased, there is a risk that lubrication will not be performed well, such that circulation of the lubricating oil may be required.

Since the hydraulic motor 20 according to the present embodiment is connected to the pressurizing means 10 pressurizing the combustible material through the driving shaft 21, in embodiments, a structure in which the lubricating oil is circulated may be used instead a structure in which the lubricating oil stagnates in the hydraulic motor 20. To this end, the lubricating oil pump 40 and the lubricating oil pump hydraulic motor 50 are installed at positions spaced apart from the pressurizing means 10 and the hydraulic motor 20, respectively, within the pressurizing zone 1.

Similar to that the driving shaft 21 is connected between the hydraulic motor 20 and the pressurizing means 10 so that the driving force of the hydraulic motor 20 may be transferred to the pressurizing means 10, a driving shaft 51 is connected between the lubricating oil pump hydraulic motor 50 and the lubricating oil pump 40 so that driving force of the lubricating oil pump hydraulic motor 50 may be transferred to the lubricating oil pump 40.

In order to lubricate between the components included in the hydraulic motor 20, the lubricating oil may be supplied into the hydraulic motor 20 through a lubricating oil supplying line 41 extended from the lubricating oil pump 40 to the hydraulic motor 20 and may return to the lubricating oil pump 40 through a lubricating oil returning line 42 extended from the hydraulic motor 20 to the lubricating oil pump 40.

Meanwhile, the supply of an operating fluid to the hydraulic motor 20 and the lubricating oil pump hydraulic motor 50 may be simply performed by a hydraulic pressure generating apparatus that is already installed in a marine structure. However, according to the present embodiment, a dedicated hydraulic pressure generating apparatus 53 for the hydraulic motor 20 driving the pressurizing means 10 pressurizing the combustible material and the lubricating oil pump hydraulic motor 50 driving the lubricating oil pump 40 is installed, such that the hydraulic motor 20 and the lubricating oil pump hydraulic motor 50 may receive the operating fluid.

The dedicated hydraulic pressure generating apparatus 53 includes a first hydraulic pump 24 supplying the operating fluid to the hydraulic motor 20, a second hydraulic pump 54 supplying the operating fluid to the lubricating oil pump hydraulic motor 50, and a reservoir 52 storing the operating fluid therein.

Two hydraulic pumps having the same specification may be included as the first hydraulic pump 24 in the hydraulic pressure generating apparatus 53 in order to provide against a fault.

The operating fluid stored in the reservoir 52 may be pressurized by the first hydraulic pump 24, be supplied to the hydraulic motor 20 through a first supplying line 25 to operate the hydraulic motor 20, and then return again to the reservoir 52 through a first returning line 26. A portion or all of the operating fluid returning through the first returning line 26 may be supplied directly toward an upper portion of the first hydraulic motor 24 of the first supplying line 25 without passing through the reservoir 52, if necessary.

In addition, the operating fluid stored in the reservoir 52 may be pressurized by the second hydraulic pump 54, be supplied to the lubricating oil pump hydraulic motor 50 through a second supplying line 55 to operate the lubricating oil pump hydraulic motor 50, and then return again to the reservoir 52 through a second returning line 56. A portion or all of the operating fluid returning through the second returning line 56 may be supplied directly toward an upper portion of the second hydraulic pump 54 of the second supplying line 55 without passing through the reservoir 52, if necessary.

According to the present embodiment, a first drain line 27 used when draining all of the operating fluid in the hydraulic motor 20 for maintenance of the hydraulic motor 20 may be installed. The first drain line 27 may be extended from the hydraulic motor 20, particularly, a lower end portion of the hydraulic motor 20 to an outer portion of the reservoir 52 or the hydraulic pressure generating apparatus 53. The first drain line 27 has a valve 28 installed thereon, and the valve 28 is opened only when a drain work is performed, thereby draining the operating fluid in the hydraulic motor 20 toward, for example, the reservoir 52.

In addition, according to the present embodiment, a second drain line 57 used when draining all of the operating fluid in the lubricating oil pump hydraulic motor 50 for maintenance of the lubricating oil pump hydraulic motor 50 may be installed. The second drain line 57 may be extended from the lubricating oil pump hydraulic motor 50, particularly, a lower end portion of the lubricating oil pump hydraulic motor 50 to an outer portion of the reservoir 52 or the hydraulic pressure generating apparatus 53. The second drain line 57 has a valve 58 installed thereon, and the valve 58 is opened only when a drain work is performed, thereby draining the operating fluid in the lubricating oil pump hydraulic motor 50 toward, for example, the reservoir 52.

The hydraulic motor 20 and the lubricating oil pump hydraulic motor 50 according to the present embodiment may be a speed variable hydraulic motor of which a speed is variable. In the case of using the speed variable hydraulic motor, there is no need to use a separate deceleration apparatus. Therefore, the speed variable hydraulic motor occupies a smaller installation space and is more advantageous in terms of maintenance as compared with an electric motor requiring a deceleration apparatus such as a deceleration gear, or the like.

FIG. 5 is a view showing another example of a combustible material transferring apparatus driven by a hydraulic motor according to an embodiment of the invention.

The combustible material transferring apparatus according to an embodiment of the invention shown in FIG. 5 includes a pressurizing means 10 installed in a transferring pipe 2 within a pressurizing zone 1 and pressurizing a combustible material to transfer the combustible material in one direction within the transferring pipe 2 and a hydraulic motor 20, which is a driving means installed together with the pressurizing means 10 within the pressurizing zone 1 and driving the pressurizing means 10.

As the pressurizing means 10, a pump may be used in the case of transferring a combustible material in a liquid state, such as a LNG, and a compressor may be used in the case of transferring a combustible material in a gas state such as a natural gas (BOG).

Since the pressurizing zone 1, which is a pump room or a compressor room, is a zone in which the possibility of explosion is present due to leakage of the combustible material, a device using electricity, which may cause a spark, may not be installed in the pressurizing zone in order to secure safety. Since the hydraulic motor 20 does not use the electricity, it may be installed in the pressurizing zone 1.

As described above, the hydraulic motor is used instead of the electric motor as a driving means for driving the pressurizing means 10 such as the pump, the compressor, or the like, installed in the pressurizing zone 1, thereby making it possible to provide a combustible material transferring apparatus and method advantageous in terms of maintenance and space utilization without installing the electric motor in the pressurizing zone 1 in which the possibility of explosion is present due to the leakage of the combustible material.

A driving shaft 21 is connected between the hydraulic motor 20 and the pressurizing means 10, and driving force of the hydraulic motor 20 may be transferred to the pressurizing means 10 through the driving shaft 21.

The combustible material transferring apparatus according to an embodiment of the invention shown in FIG. 5 utilizes an operating fluid used to drive the hydraulic motor 20 as lubricating oil supplied to the hydraulic motor 20, unlike an embodiment shown in FIG. 4. Therefore, the combustible material transferring apparatus shown in FIG. 5 does not need the lubricating oil pump 40 and the lubricating oil pump hydraulic motor 50 shown in FIG. 4.

Meanwhile, the supply of the operating fluid to the hydraulic motor 20 may be simply performed by a hydraulic pressure generating apparatus that is already installed in a marine structure. However, according to the present embodiment, the hydraulic motor 20 driving the pressurizing means 10 pressurizing the combustible material and a dedicated hydraulic pressure generating apparatus 53 for supplying the lubricating oil to the hydraulic motor 20 are installed, such that the hydraulic motor 20 may receive the operating fluid and the lubricating oil.

The dedicated hydraulic pressure generating apparatus 53 includes a first hydraulic pump 24 supplying the operating fluid to the hydraulic motor 20, a second hydraulic pump 54 supplying the operating fluid as the lubricating oil to the hydraulic motor 20, and a reservoir 52 storing the operating fluid therein.

Two hydraulic pumps having the same specification may be included as the first hydraulic pump 24 in the hydraulic pressure generating apparatus 53 in order to provide against a fault.

The operating fluid stored in the reservoir 52 may be pressurized by the first hydraulic pump 24, be supplied to the hydraulic motor 20 through a first supplying line 25 to operate the hydraulic motor 20, and then return again to the reservoir 52 through a first returning line 26. A portion or all of the operating fluid returning through the first returning line 26 may be supplied directly toward an upper portion of the first hydraulic motor 24 of the first supplying line 25 without passing through the reservoir 52, if necessary.

In addition, the operating fluid stored in the reservoir 52 may be pressurized by the second hydraulic pump 54, be supplied as the lubricating oil to the hydraulic motor 20 through a second supplying line 55, and then return again to the reservoir 52 through a second returning line 56. A portion or all of the operating fluid returning through the second returning line 56 may be supplied directly toward an upper portion of the second hydraulic pump 54 of the second supplying line 55 without passing through the reservoir 52, if necessary.

According to the present embodiment, a first drain line 27 used when draining all of the operating fluid in the hydraulic motor 20 for maintenance of the hydraulic motor 20 may be installed. The first drain line 27 may be extended from the hydraulic motor 20, particularly, a lower end portion of the hydraulic motor 20 to an outer portion of the reservoir 52 or the hydraulic pressure generating apparatus 53. The first drain line 27 has a valve 28 installed thereon, and the valve 28 is opened only when a drain work is performed, thereby draining the operating fluid in the hydraulic motor 20 toward, for example, the reservoir 52.

In addition, according to the present embodiment, a lubricating oil drain line 67 used when draining all of the lubricating oil used in the hydraulic motor for maintenance of the hydraulic motor 20 may be installed. The lubricating oil drain line 67 may be extended from the hydraulic motor 20, particularly, a lubricating oil circulating part in the hydraulic motor 20 to an outer portion of the reservoir 52 or the hydraulic pressure generating apparatus 53. The lubricating oil drain line 67 has a valve 68 installed thereon, and the valve 68 is opened only when a drain work is performed, thereby draining the operating fluid as the lubricating oil in the hydraulic motor 20 toward, for example, the reservoir 52.

The hydraulic motor 20 according to the present embodiment may be a speed variable hydraulic motor of which a speed is variable. In the case of using the speed variable hydraulic motor, there is no need to use a separate deceleration apparatus. Therefore, the speed variable hydraulic motor occupies a smaller installation space and is more advantageous in terms of maintenance as compared with an electric motor requiring a deceleration apparatus such as a deceleration gear, or the like.

According to embodiments of the invention, the apparatus for supplying a fuel to an engine of a ship uses the hydraulic motor that does not generate an electric spark as a driving source of the high pressure motor installed in a danger zone, thereby making it possible to miniaturize and lighten all devices, and the apparatus for supplying a fuel to an engine of a ship is installed in an explosion-proof zone without an additional device, thereby making it possible to supply power and lubricating oil to the high pressure pump.

In addition, according to embodiments of the invention, an extra hydraulic power unit is provided, thereby making it possible to always drive the high pressure pump without an additional delay even in the case in which a fault occurs in the hydraulic power unit that is in operation.

Further, according to embodiments of the invention, hydraulic pressure is supplied to the lubricating motor and the hydraulic motor using one hydraulic power unit, thereby making it possible to decrease the number of separate additional devices.

In addition, the apparatus for regulating a speed of a high pressure pump of a ship uses the hydraulic motor that does not generate an electric spark as a driving source of the high pressure motor installed in a danger zone, thereby making it possible to miniaturize and lighten all devices, and the apparatus for regulating a speed of a high pressure pump of a ship is installed in an explosion-proof zone without an additional device, thereby making it possible to regulate a speed of the high pressure pump.

Figure 14:
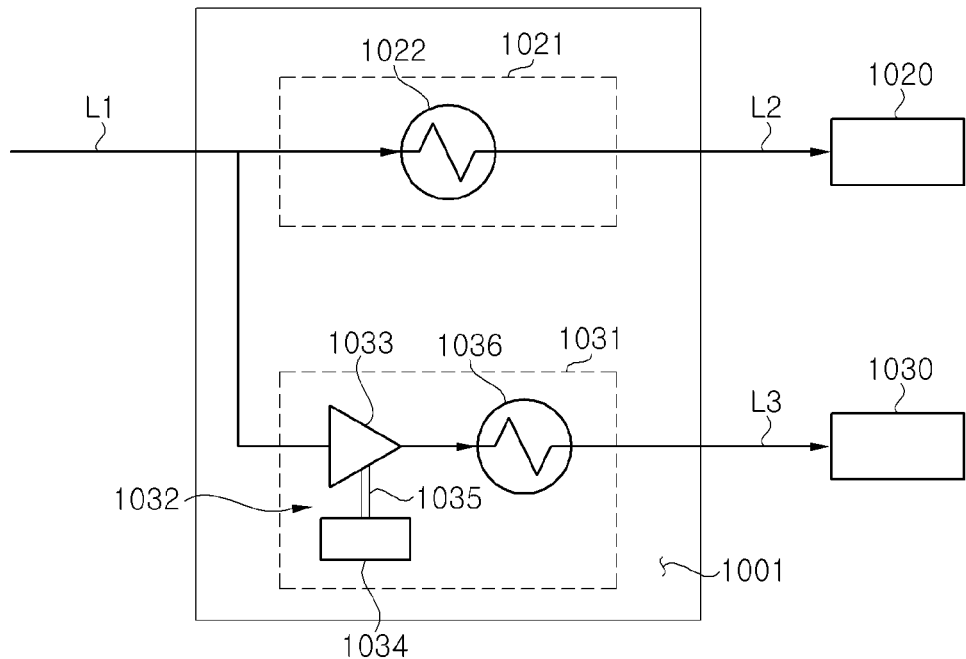
FIG. 14 is a diagram of a fuel gas supply apparatus in a vessel having a high-pressure engine and a low-pressure engine therein.

Turning to FIG. 14 which is a diagram of a fuel gas supply apparatus in a vessel, the vessel includes a high-pressure engine and a low-pressure engine therein.

A vessel may include a plurality of engines as needed and generally includes at least one main engine (for example, an MEGI engine) for propulsion and at least one sub-engine (for example, a DF engine) for power generation. Since the main engine generally requires a higher-pressure fuel gas than the sub-engine, the sub-engine is referred to as a low-pressure engine 1020 and the main engine is referred to as a high-pressure engine 1030 in the following description.

In general, the International Maritime Organization (IMO) regulates the emission of nitrogen oxides ($NO_X$) and sulfur oxides ($SO_X$) among exhaust gases of vessels and these days, also tries to regulate the emission of carbon dioxide ($CO_2$). Particularly, the issue of the regulation of nitrogen oxides ($NO_X$) and sulfur oxides ($SO_X$) was raised by the Prevention of Marine Pollution from Ships (MARPOL) protocol in 1997. After eight years, the protocol met requirements for effectuation and entered into force in May 2005. Currently, the regulation is in force as a compulsory provision.

Therefore, in order to meet such provisions, a variety of methods have been introduced to reduce the emission of nitrogen oxides ($NO_X$). As one of these methods, a high-pressure natural gas injection engine for a marine structure such as an LNG carrier, for example, an MEGI engine has been developed and used. The MEGI engine is being spotlighted as a next-generation eco-friendly engine capable of reducing emission of carbon dioxide by 23% or more, nitrogen compounds by 80% or more, and sulfur compounds by 95% or more, as compared with a diesel engine having the same output.

Such an MEGI engine may be disposed in plants or vessels such as an LNG carrier which transports LNG while storing the LNG in a storage tank capable of withstanding cryogenic temperatures. In this case, the MEGI engine uses natural gas as fuel and requires a high pressure of about 150 to 400 bara (absolute pressure) for gas supply, depending upon a load thereof.

The MEGI engine may be directly coupled to a propeller for propulsion. To this end, the MEGI engine may be a two-stroke engine rotating at a low speed. That is, the MEGI engine is a low-speed two-stroke high-pressure natural gas injection engine.

The fuel gas supply apparatus may be configured such that fuel gas supplied through a fuel transfer line L1 from a fuel tank is supplied to the low-pressure engine 1020 through a low-pressure gas supply line L2 and to the high-pressure engine 1030 through a high-pressure gas supply line L3.

When LNG is used as fuel gas, the LNG in a liquid state is heated to undergo phase change into a gaseous state and then supplied to an engine. To this end, a low-pressure gas supply system 1021 is disposed at the low-pressure gas supply line L2, through which the fuel gas is supplied to the low-pressure engine 1020, and a high-pressure gas supply system 1031 is disposed at the high-pressure gas supply line L3, through which the fuel gas is supplied to the high-pressure engine 1030.

The low-pressure gas supply system 1021 includes a low-pressure gasification unit 1022, and the high-pressure gas supply system 1031 includes a high-pressure pump 1032 and a high-pressure gasification unit 1036. A transfer pump for transferring LNG stored in the fuel tank is disposed inside or outside the fuel tank. The pressure of fuel gas required for the low-pressure engine 1020 is similar to that of fuel gas pressurized by the transfer pump and thus, a pump need not be additionally disposed in the low-pressure gas supply system 1021. However, the pressure of fuel gas required for the high-pressure engine 1030 is higher than that of the fuel gas pressurized by the transfer pump and thus, the high-pressure pump 1032 needs to be additionally disposed in the high-pressure gas supply system 1031 to pressurize the fuel gas pressurized by the transfer pump to a higher pressure of about 150 to 400 bara.

The high-pressure pump 1032 may include a pumping unit 1033 for pressurizing and discharging introduced LNG, a drive unit 1034 (for example, a motor) for driving the pumping unit 1033, and a connecting shaft 1035 for interconnecting the pumping unit 1033 and the drive unit 1034 to transmit power. Facilities, such as pumps or compressors, as well as the high-pressure pump 1032 have a seal structure. However, LNG can leak through the seal structure.

Since LNG leaked from the pump can cause explosion or fire, a space (namely, a first space 1001) for receiving the high-pressure pump 1032 is distinguished as a danger zone, and explosion proof products with a higher grade have to be used for the facilities arranged together with the high-pressure pump 1032 in the first space or room 1001. In the case where the low-pressure gas supply system 1021 and the high-pressure gas supply system 1031 are all arranged together with the high-pressure pump 1032 in the first space 1001 as shown in FIG. 14, explosion proof products have to be used for the facilities, such as the low-pressure gasification unit 1022 included in the low-pressure gas supply system 1021 and the high-pressure gasification unit 1036 included in the high-pressure gas supply system 1031, thereby causing increase in facility costs.

Hereinafter, embodiments of the invention will be described in detail with reference to FIGS. 15 to 17. In addition, it should be understood that the following embodiments may be modified in various different forms and the invention is not limited thereto.

Figure 15:
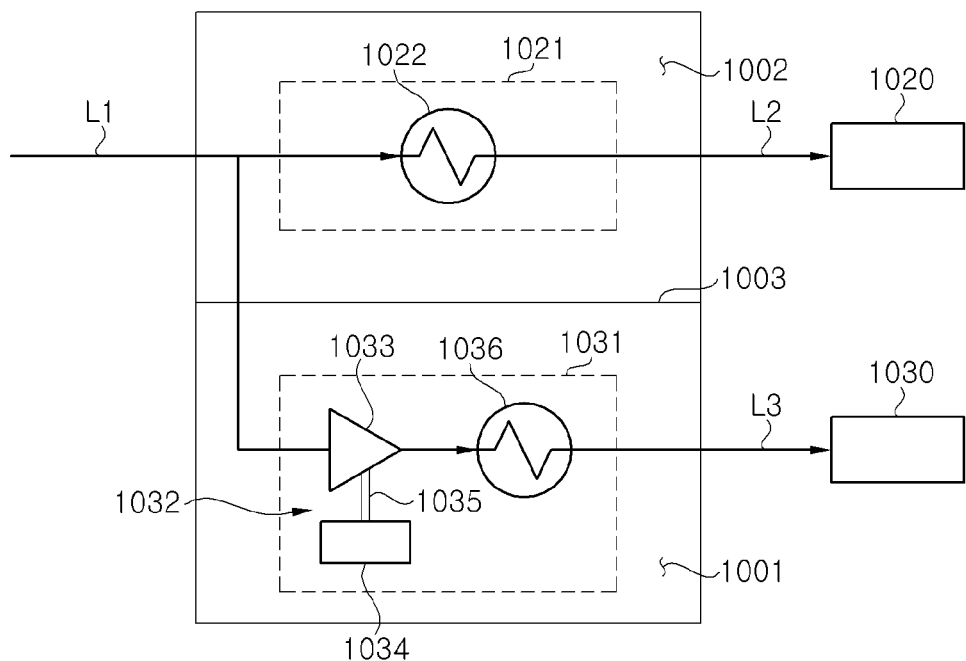
FIG. 15 is a diagram of a fuel gas supply apparatus according to an embodiment of the invention.

FIG. 15 is a diagram of a fuel gas supply apparatus according to an embodiment of the invention, which is disposed in a vessel having a high-pressure engine and a low-pressure engine therein.

A vessel may include a plurality of engines therein as needed and generally includes at least one high-pressure engine 1030 (for example, an MEGI engine) provided for propulsion and at least one low-pressure engine 1020 (for example, a DF engine) provided for power generation. The high-pressure engine 1030 requires a higher-pressure fuel gas than the low-pressure engine 1020.

As used herein, the term "vessel" is a concept including plants, such as an LNG FPSO, an Oil FPSO, an LNG FSRU, and a BMPP, as well as vessels, such as a liquefied gas carrier, an LNG RV, and a container ship.

In addition, the term "fuel gas" as used herein is a concept including a gas that is stored as cargo in a storage tank and supplied to an engine when necessary, as well as a gas that is stored in a fuel tank for fuel supply to various types of engines provided to a vessel for propulsion and power generation.

In the fuel gas supply apparatus according to this embodiment, fuel gas supplied through a fuel transfer line L1 from a fuel tank is supplied to the low-pressure engine 1020 through a low-pressure gas supply line L2 and to the high-pressure engine 1030 through a high-pressure gas supply line L3.

A low-pressure gas supply system 1021 is provided to the low-pressure gas supply line L2 through which the fuel gas is supplied to the low-pressure engine 1020, and a high-pressure gas supply system 1031 is provided to the high-pressure gas supply line L3 through which the fuel gas is supplied to the high-pressure engine 1030.

The low-pressure gas supply system 1021 includes a low-pressure gasification unit 1022, and the high-pressure gas supply system 1031 includes a high-pressure pump 1032 and a high-pressure gasification unit 1036. Examples of facilities included in the low-pressure gas supply system 1021 in addition to the low-pressure gasification unit 1022 may include various types of devices used for supply of the fuel gas to the low-pressure engine and a control unit for controlling the devices. Examples of facilities included in the high-pressure gas supply system 1031 in addition to the high-pressure pump 1032 and the high-pressure gasification unit 1036 may include various types of devices used for supply of the fuel gas to the high-pressure engine and a control unit for controlling the devices.

A transfer pump for transferring LNG stored in the fuel tank is disposed inside or outside the fuel tank. The pressure of fuel gas required for the low-pressure engine 1020 is similar to that of fuel gas pressurized by the transfer pump and thus, a pump need not be additionally disposed in the low-pressure gas supply system 1021. However, the pressure of a fuel gas required for the high-pressure engine 1030 is higher than that of the fuel gas pressurized by the transfer pump and thus, the high-pressure pump 1032 needs to be additionally disposed in the high-pressure gas supply system 1031 to pressurize the fuel gas pressurized by the transfer pump to a higher pressure of about 150 to 400 bara.

The LNG which is pressurized to a higher pressure by the high-pressure pump 1032 and then heated in the high-pressure gasification unit 1036 is in a super-critical state and thus, cannot be distinguished into gas or liquid. Therefore, the term "gasification" as used in the high-pressure gasification unit 1036 should be understood as a meaning of heating LNG to a temperature required for the high-pressure engine.

The high-pressure pump 1032, which is typically a reciprocating pump, may include a pumping unit 1033 for pressurizing and then discharging the introduced LNG, a drive unit 1034 (for example, a motor) for driving the pumping unit 1033, and a connecting shaft 1035 for interconnecting the pumping unit 1033 and the drive unit 1034 to transmit power.

Since the LNG leaked from the pump can cause explosion or fire, a space (namely, a first space 1001) for receiving the high-pressure pump 1032 is distinguished as a danger zone, and explosion proof products of a higher grade must be used for the facilities arranged together with the high-pressure pump 1032 in the first space 1001.

According to the embodiment of the invention shown in FIG. 15, the low-pressure gas supply system 1021 is disposed in a separate space, namely, a second space 1002 distinguished by a partition wall 1003 from the high-pressure gas supply system 1031 including the high-pressure pump 1032. Since the facilities, such as the low-pressure gasification unit 1022, included in the low-pressure gas supply system 1021 are disposed in the space separated from the high-pressure pump 1032, an enhanced explosion grade need not to be applied thereto, thereby reducing costs for manufacturing facilities. However, the facilities of the high-pressure gas supply system 1031 arranged together with the high-pressure pump 1032 in the first space 1001 must be manufactured by applying an enhanced explosion grade.

Figure 16:
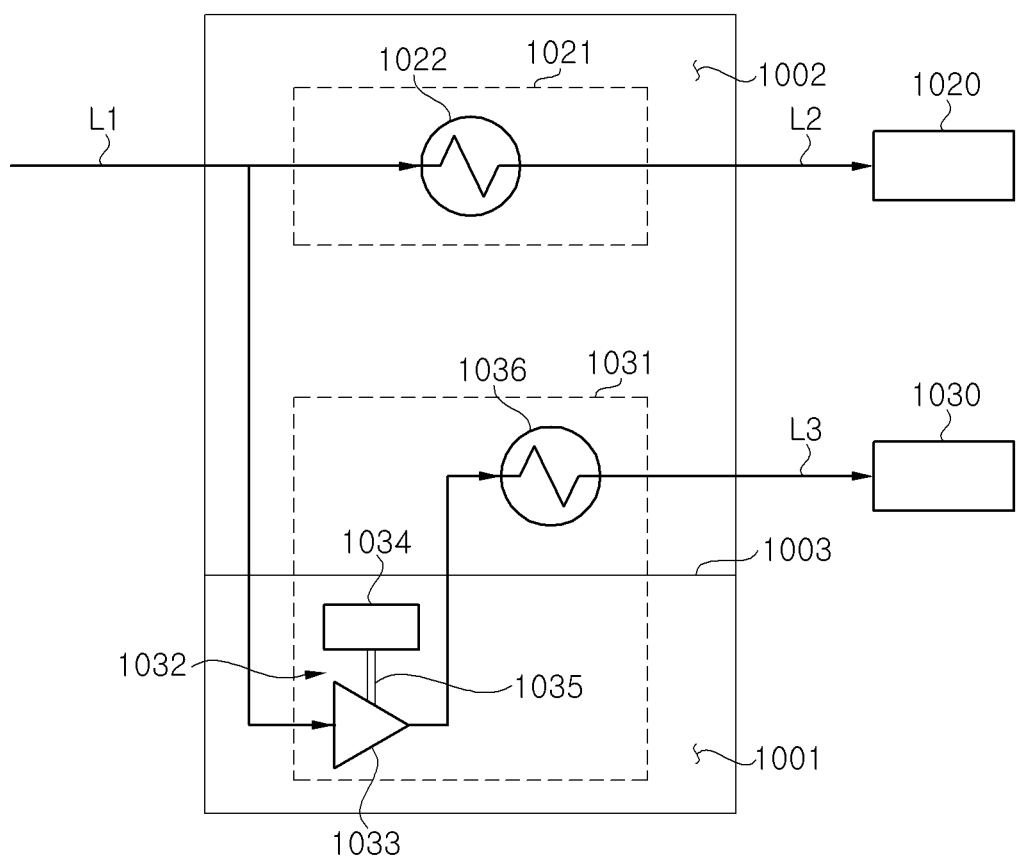
FIG. 16 is a diagram of a fuel gas supply apparatus according to an embodiment of the invention.

FIG. 16 is a diagram of a fuel gas supply apparatus according to an embodiment of the invention, which is disposed in a vessel having a high-pressure engine and a low-pressure engine therein.

The following description is focused on a difference between the fuel gas supply apparatuses according to the above embodiments. In addition, like elements to those of the embodiment are denoted by like numerals, and detailed descriptions thereof will be omitted.

The fuel gas supply apparatus according to the embodiment is the same as the fuel gas supply apparatus according to the embodiment in that the fuel gas supply apparatus includes a low-pressure gas supply system 1021 provided to a low-pressure gas supply line L2 for supplying fuel gas to a low-pressure engine 1020 and including a low-pressure gasification unit 1022 and a high-pressure gas supply system 1031 provided to a high-pressure gas supply line L3 for supplying fuel gas to a high-pressure engine 1030 and including a high-pressure pump 1032 and a high-pressure gasification unit 1036, and the high-pressure pump 1032 includes a pumping unit 1033, a drive unit 1034, and a connecting shaft 1035.

However, according to the embodiment, among facilities included in the high-pressure gas supply system 1031, only the high-pressure pump 1032 is disposed in a first space 1001, and the rest of the facilities except for the high-pressure pump 1032, for example, the high-pressure gasification unit 1036, is arranged together with the low-pressure gas supply system 1021 in a space separated from the first space 1001 by a partition wall 1003, namely, in a second space or room 1002. Since the facilities, such as the low-pressure gasification unit 1022, included in the low-pressure gas supply system 1021 and, among the facilities included in the high-pressure gas supply system 1031, the rest of the facilities except for the high-pressure pump 1032, for example the high-pressure gasification unit 1036, are disposed in the space separated from the high-pressure pump 1032, an enhanced explosion grade needs not to be applied thereto, thereby reducing costs required for manufacturing facilities. In embodiment, the room 1001 is gas-tightly separated from the room 1002, and the partition wall 1003 is a gas-tight wall to inhibit air or gas in the room 1001 from flowing into the room 1002 through the partition wall 1003.

Figure 17:
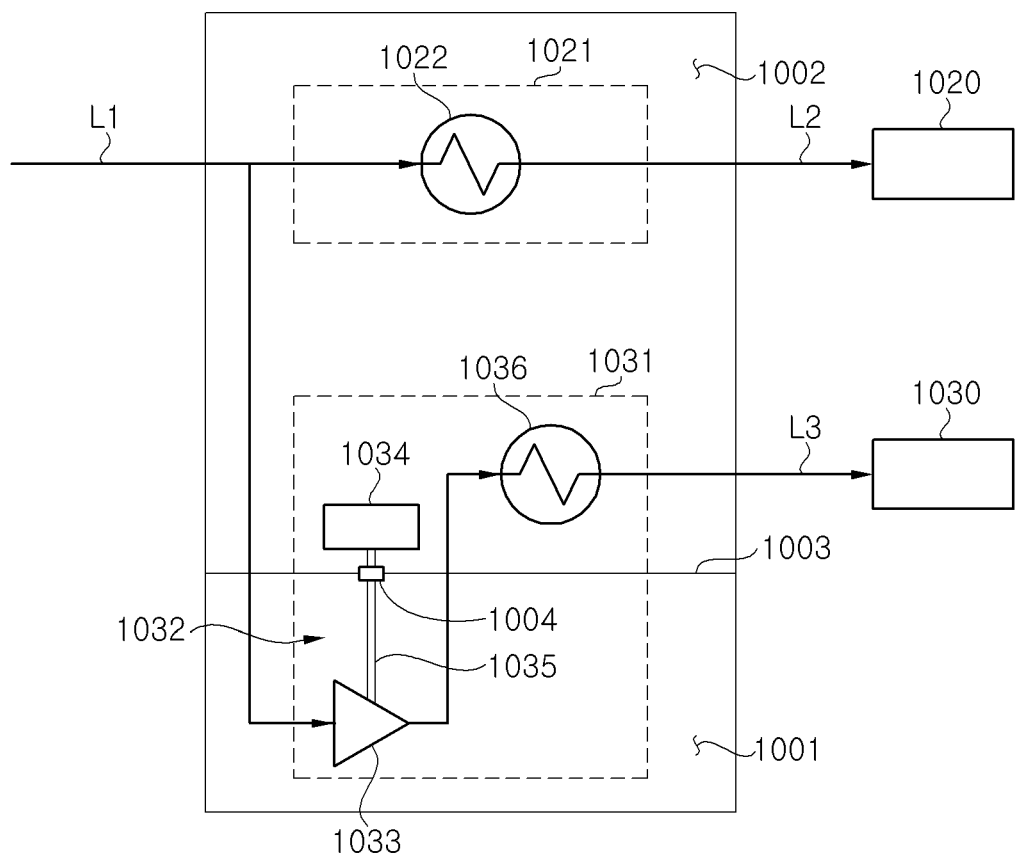
FIG. 17 is a diagram of a fuel gas supply apparatus according to an embodiment of the invention.

FIG. 17 is a diagram of a fuel gas supply apparatus according to an embodiment of the invention, which is disposed in a vessel having a high-pressure engine and a low-pressure engine therein.

The following description is focused on a difference between the fuel gas supply apparatuses according to the above embodiments. In addition, like elements to those of the embodiment are denoted by like numerals, and detailed descriptions thereof will be omitted.

The fuel gas supply apparatus according to the embodiment is the same as the fuel gas supply apparatus according to the embodiment in that the fuel gas supply apparatus includes a low-pressure gas supply system 1021 provided to a low-pressure gas supply line L2 for supplying fuel gas to a low-pressure engine 1020 and including a low-pressure gasification unit 1022 and a high-pressure gas supply system 1031 provided to a high-pressure gas supply line L3 for supplying fuel gas to a high-pressure engine 1030 and including a high-pressure pump 1032 and a high-pressure gasification unit 1036, and the high-pressure pump 1032 includes a pumping unit 1033, a drive unit 1034, and a connecting shaft 1035.

However, according to the embodiment, among facilities included in the high-pressure gas supply system 1031, only the high-pressure pump 1032 is disposed in a first space 1001, and the rest of the facilities except for the pumping unit 1033 of the high-pressure pump 1032, for example the high-pressure gasification unit 1036 and the drive unit 1034 of the high-pressure pump 1032, are arranged together with the low-pressure gas supply system 1021 in a space separated from the first space 1001 by a partition wall 1003, namely, in a second space 1002. Since the facilities, such as the low-pressure gasification unit 1022, included in the low-pressure gas supply system 1021 and, among the facilities included in the high-pressure gas supply system 1031, the rest of the facilities except for the pumping unit 1033 of the high-pressure pump 1032, for example the high-pressure gasification unit 1036 and the drive unit 1034 of the high-pressure pump 1032, are disposed in the space separated from the pumping unit 1033 of the high-pressure pump 1032, an enhanced explosion grade needs not to be applied thereto, thereby reducing costs required for manufacturing facilities.

The drive unit 1034 of the high-pressure pump 1032 does not pass the LNG therethrough and thus leakage of LNG does not occur. Accordingly, when only the pumping unit 1033 having the LNG introduced thereinto and pressurized and discharged thereby, among the facilities of the high-pressure pump 1032, is disposed within a danger zone, an enhanced explosion grade needs not to be applied to the drive unit 1034 of the high-pressure pump 1032 disposed in the separate space divided by the partition wall 1003.

According to the embodiment, a bearing 4 having a sealing function may be disposed in the partition wall 1003 such that the connecting shaft 1035 interconnecting the pumping unit 1033 and the drive unit 1034 may pass therethrough.

According to the embodiments of the invention, since the high-pressure pump 1032, particularly the pumping unit 1033 of the high-pressure pump 1032, through which fuel gas can leak is disposed in the first space 001, which is a danger zone divided by the partition wall 1003, it is possible to minimize an influence on the rest facilities even upon leakage of the fuel gas. Thus, explosion proof products of a low grade may be used for the facilities which are not disposed in the space 1, thereby reducing initial installation costs.

A drive unit such as an electric motor may be banned from spaces, in which the pump is disposed, according to regulations, irrespective of an explosion proof grade. In the case where a fuel gas supply apparatus is constituted as in the embodiment of the invention, only the pumping unit 1033 of the high-pressure pump 1032 is disposed in the first space 1001, and the drive unit 1034 of the high-pressure pump 1032, namely, an electric motor, is disposed in the second space 1002 separated from the first space 1001 by the partition wall 1003. Therefore, the fuel gas supply apparatus can be unfettered by regulations.

Ship with Fuel Gas Engine and Fuel Gas Supply System

Figure 18:
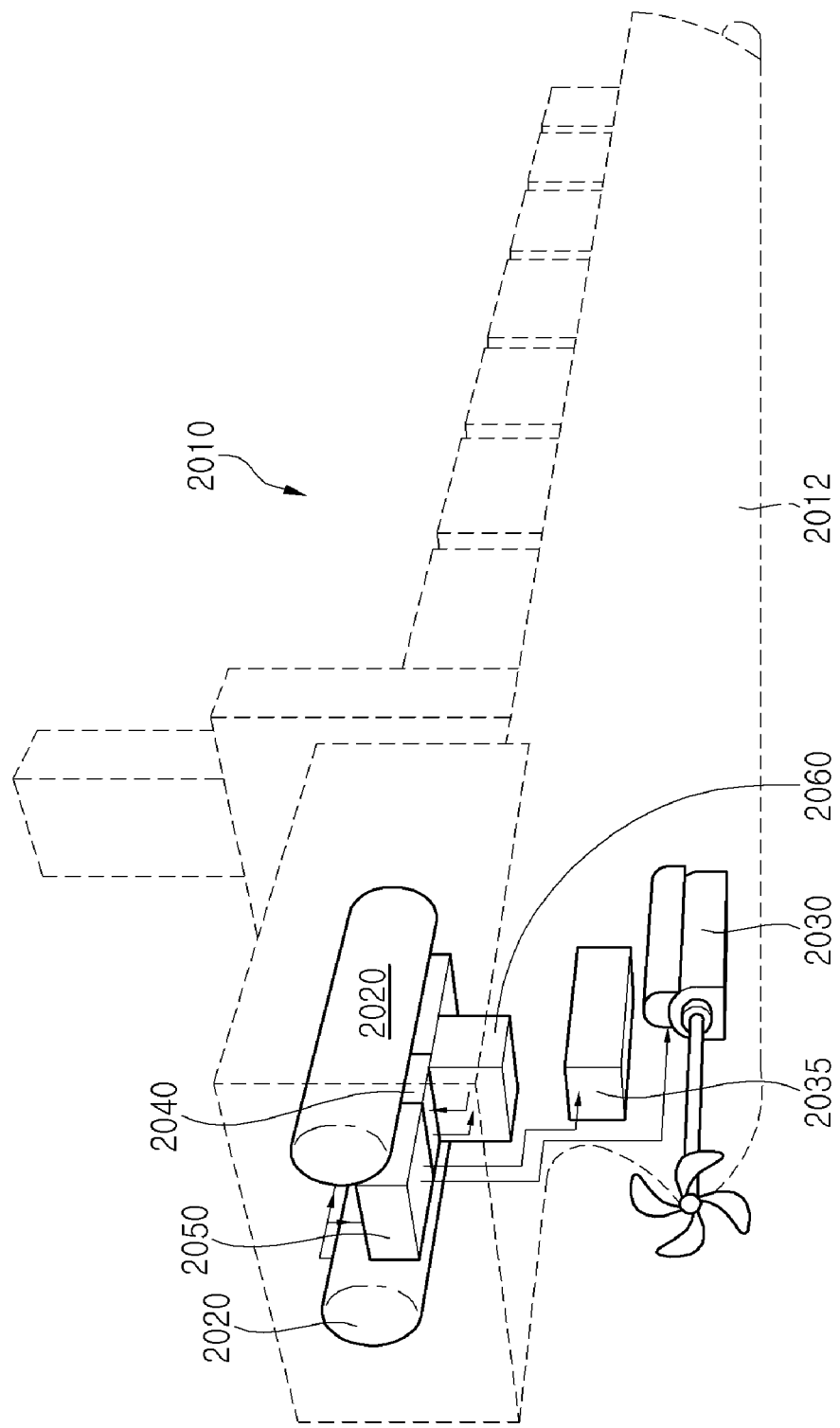
FIG. 18 shows a ship with a fuel supply system according to embodiments of the invention.
Figure 19:
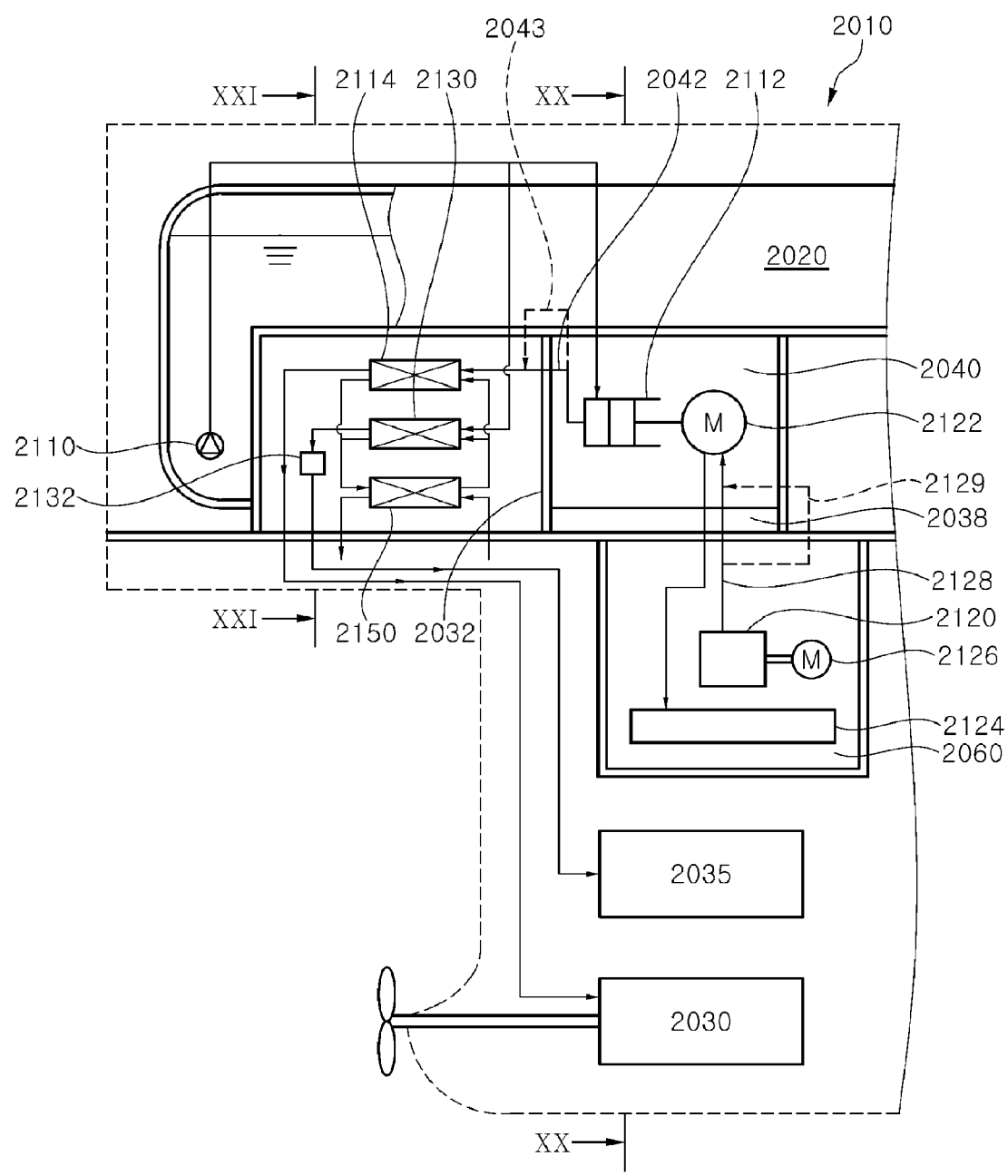
FIG. 19 shows components of the fuel supply system enclosed in compartments of the ship shown in FIG. 18.

FIG. 18 shows a ship according to embodiments of the invention. Referring to FIGS. 18 and 19, a ship 2010 includes first and second fuel tanks 2020 2020, a fuel supply system, a high-pressure engine 2030 and a low-pressure engine 2035.

Fuel Tank and Fuel

The fuel tank 2020 contains fuel in a liquid state. In one embodiment, the fuel contained in the tanks 2020 may be liquefied natural gas (LNG) in liquid state. In another embodiment, the fuel may be liquefied petroleum gas (LPG) in liquid state or ethane in liquid state. In other embodiments, the fuel may be any liquefied hydrocarbon fuel.

The ship 2010 includes a low-pressure pump 2110 to supply the fuel via a conduit to a high-pressure pump or a vaporizer 2130 which are discussed below. The low-pressure pump 2110 is enclosed in each tank 2020 and submerged in the fuel in liquid state contained in the tank.

High-Pressure Engine

In embodiments, the high-pressure engine 2030 is used to propel the ship 2010. The high-pressure fuel engine 2030 may be a supercritical fuel engine that combustions the fuel in a supercritical state. For this, the fuel is pressurized to have a pressure in a range from about 150 bar absolute (bar(a)) to about 400 bar(a), and heated to be in a supercritical state. And then, the fuel is supplied to the supercritical fuel engine. In one embodiment, the supercritical fuel engine may be an M-type Electronic Gas Injection (MEGI) engine.

Low-Pressure Engine

In embodiments, the low-pressure engine 2035 is used to generate electricity and heat that are used in the ship 2010. The low-pressure engine 2035 may be a vapor fuel engine that burns the fuel in a vaporized state. For this, the fuel is pumped from the fuel tank 2020 by a low-pressure pump 2110 contained in the fuel tank, and heated to be in a vaporized state. And then, the fuel in a vaporized state is supplied to the low-pressure fuel engine 2035. The fuel in a vaporized state may have a pressure in a range from about 2 bar(a) to about 20 bar(a). In embodiments, the fuel in a vaporized state may have a pressure in a range from about 6 bar(a) to about 10 bar(a). In one embodiment, the low-pressure engine or vapor fuel engine 2035 may be a dual-fuel diesel-electric (DFDE) engine. In another embodiment, the low-pressure engine 2035 may be a gas turbine engine.

Supercritical Fuel Supply

For supplying fuel in a supercritical state, in embodiments, the ship 2010 includes a high-pressure fuel pump 2112 and a heater 2114. The fuel pump 2112 is in fluid communication with the fuel tank 2020 and pressurizes the fuel from the fuel tank 2020 to a pressure in a range from about 150 bar(a) to about 400 bar(a). The heater 2114 is in fluid communication with the fuel pump 2112 and heats the pressurized fuel from the fuel pump 2112 to a supercritical state of the fuel. The fuel in a supercritical state is supplied to the supercritical fuel engine 2030 and combusted in the engine 2030 which propels the ship 2010.

Hydraulic System

In embodiments, to operate the fuel pump 2112, a hydraulic system and an electric motor 2126 are provided. The hydraulic system includes a hydraulic pump 2120 and a hydraulic motor 2122 connected to the hydraulic pump 2120 through hydraulic fluid conduits 2128. The hydraulic pump 2120 converts mechanical power produced by the electric motor 2126 into a pressurized flow of a hydraulic fluid. The pressurized flow of the hydraulic fluid is transferred to the hydraulic motor 2122. In turn, the hydraulic motor 2122 converts the pressurized flow from the hydraulic pump 2120 into torque to power the fuel pump 2112 such that the fuel pump 2112 pressurizes the fuel. In embodiments, the hydraulic system further includes a container or reservoir 2124 for containing the hydraulic fluid. The container 2124 is in fluid communication with the hydraulic pump 2120 and the hydraulic motor 2122.

Fuel Pump and Hydraulic Motor

In the illustrated embodiments, the fuel pump 2112 and the hydraulic motor 2122 may be separate from each other and connected to each other via a rotating shaft. In other embodiments, the fuel pump 2112 and the hydraulic motor 2122 are built in an integrated body.

In embodiments, the fuel pump 2112 is a piston pump including a piston. The fuel pump 2112 further includes a rotation-to-reciprocation converter which coverts torque from the hydraulic motor 2122 to reciprocating motion of the piston.

Lubrication System

In embodiments, the ship 2010 includes a lubrication pump for lubricating a fuel pump 2112 module which includes the fuel pump 2112 and the hydraulic motor 2122. In embodiments, the fuel pump 2112 module includes various mechanisms which may be lubricated. The lubricant pump is to pump lubricant to the fuel pump 2112, the hydraulic motor 2122 and other mechanisms in the fuel pump 2112 module.

Referring to FIGS. 4, 18 and 19, in embodiments, to operate the lubricant pump, the ship 2010 includes a secondary electric motor, a secondary hydraulic pump and a secondary hydraulic motor. The secondary hydraulic pump converts torque from the electric motor 2126 into a pressurized flow of a hydraulic fluid. The secondary hydraulic motor is in fluid communication with the secondary hydraulic pump and configured to convert the pressurized flow from the secondary hydraulic pump into torque to power the lubricant pump.

Vaporized Fuel Supply System

The ship 2010 includes a vaporized fuel supply system which includes a vaporizer 2130 and a mist separator 2131. The vaporizer 2130 is in fluid communication with the fuel tank 2020 and vaporizes the fuel from the fuel tank 2020 by heating the fuel. The mist separator 2131 is in fluid communication between the vaporizer 2130 and the vapor fuel engine 2035. The mist separator 2131 removes mists contained in the fuel received from the vaporizer 2130 and returns the removed mists to the vaporizer 2130.

Compartments

Figure 20:
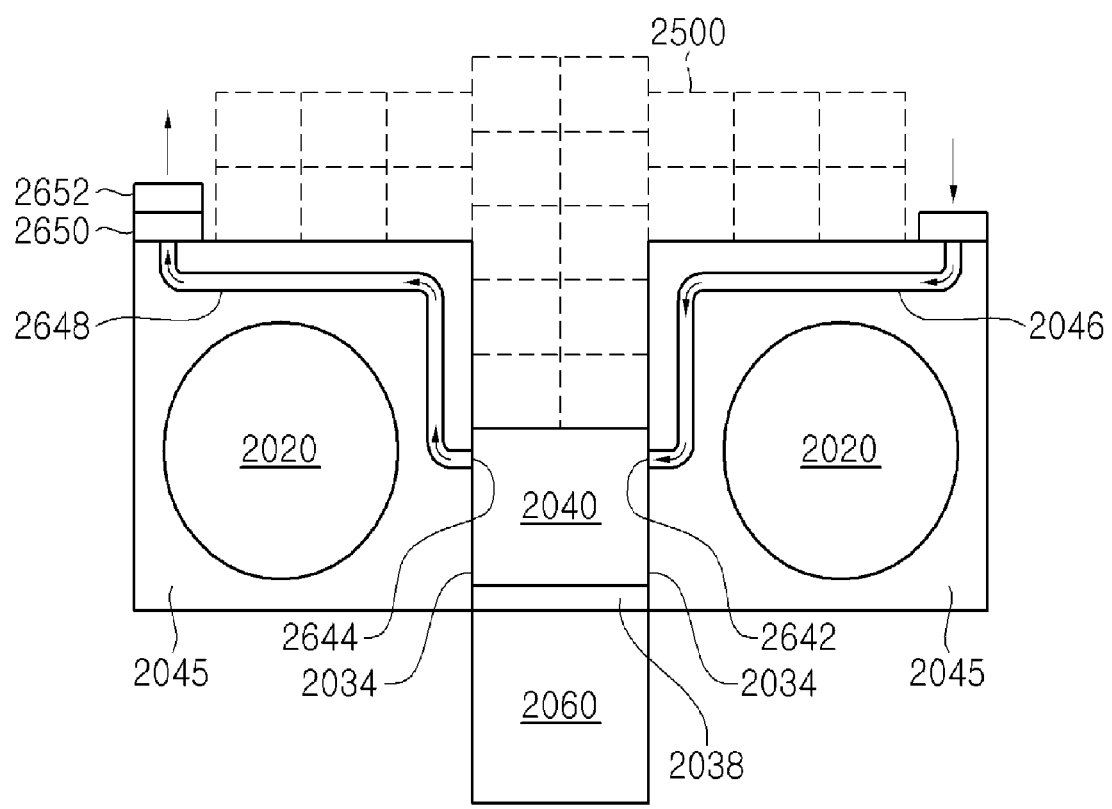
FIG. 20 is a sectional view of a ship taken along a line XX-XX of FIG. 19.
Figure 21:
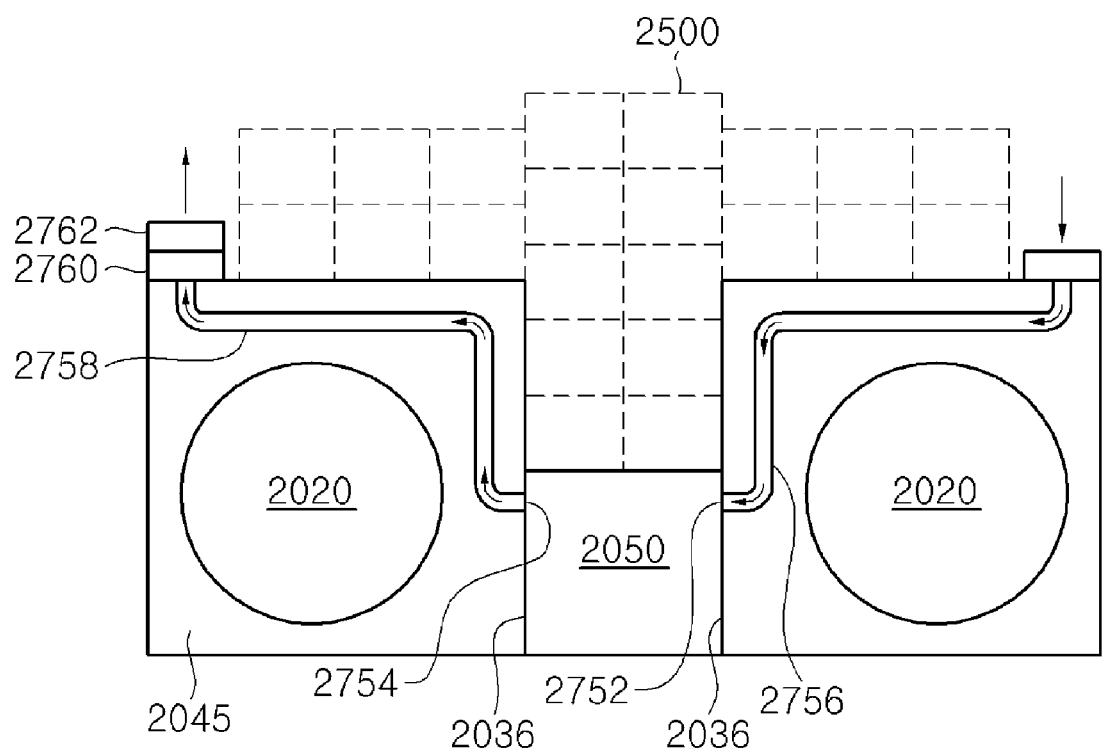
FIG. 21 is a sectional view of a ship taken along a line XXI-XXI of FIG. 20.

Referring to FIGS. 18-21, in embodiments, components of the fuel supply system are enclosed in some compartments. The ship 2010 includes fuel tank compartments 2045, a fuel pump compartment 2040, a fuel processing compartment 2040, a hydraulic pump compartment 2060, an engine compartment and other various compartments. As shown in FIGS. 20 and 21, freight containers 2500 may be loaded over the fuel tank compartments 2045, the fuel pump compartment 2040, and the fuel processing compartment 2040.

Each of the fuel tank compartments encloses one of the fuel tanks 2020. The fuel pump compartment 2040 encloses the fuel pump 2112 and the hydraulic motor 2122. The hydraulic pump compartment 2060 encloses the hydraulic pump 2120, the container 2124 and the electric motor 2126. The fuel processing compartment 2050 encloses the heater 2114 of the supercritical state fuel supply system, and further encloses the vaporizer 2130 and the mist separator 2131 of the vaporized fuel supply system.

In embodiments, each of the compartments is air-tightly separated from immediately neighboring compartments by walls 2032, 2034, 2036, 2038. In one embodiment, the fuel pump compartment 2040 includes air-tight walls to form an enclosed space of the compartment 2040 for substantially inhibiting air in the compartment 2040 from flowing into the neighboring compartments through the walls. However, as discussed below, air in the compartment 2040 can be discharged to outside the ship through a conduit without flowing into the neighboring compartments. In another embodiment, the fuel processing compartment 2050 includes air-tight walls to form an enclosed space of the compartment 2050 for substantially inhibiting air in the compartment 2050 from flowing into the neighboring compartments through the walls. However, as discussed below, air in the compartment 2050 can be discharged to outside the ship through a conduit without flowing into the neighboring compartments.

In embodiments, the fuel pump compartment 2040 is air-tightly separated from the fuel processing compartment 2050 by air-tight walls including an air-tight partitioning wall 2032. As a result, the fuel pump 2112 and the hydraulic motor 2122 are air-tightly isolated from the heater 2114, the vaporizer 2130 and the mist separator 2131. Also, the fuel pump compartment 2040 is air-tightly separated from other neighboring tank compartments, for example, the fuel tank compartments 2045 by the wall 2034.

In embodiments, the fuel pump compartment 2040 is air-tightly separated from the hydraulic pump compartment 2060 by air-tight walls. Thus, the fuel pump 2112 and the hydraulic motor 2122 are air-tightly isolated from the hydraulic pump 2120 and the electric motor 2126.

Location of Compartments and Walls Between Compartments

In embodiments, the ship 2010 includes a hull 2012 and a deck 2014 placed over the hull. The fuel processing compartment 2050 and the high-pressure pump compartment are located above the deck 2014 of the ship 2010. The hydraulic pump compartment 2060 is located under the deck. In one embodiment, the fuel processing compartment 2050 and the fuel pump compartment 2040 are adjacent to each other and air-tightly separated from each other by a partitioning wall located between the compartments. A down-stream line 2042 from the fuel pump 2112 to the heater 2114 passes through one of the partitioning wall. In alternative embodiment, the down-stream line from the fuel pump 2112 to the heater 2114 does not pass through the partitioning wall 2032, but extends through other walls to go around the wall 2032 as illustrated with a broken line 2043 in FIG. 19.

In one embodiment, the ship 2010 includes a cofferdam 2038 interposed between the fuel pump compartment 2040 and the hydraulic pump compartment 2060. The hydraulic fluid conduits 2128 may pass through the cofferdam 2038. In another embodiment, the hydraulic fluid conduits do not pass through the cofferdam 2038 but extend through other walls to go around the cofferdam 2038 as illustrated with a broken line 2129 in FIG. 19.

Air Circulation System for Compartments

Referring to FIG. 20, in embodiments, the fuel pump compartment 2040 includes a first air inlet 2642 and a first air outlet 2644. The first air inlet 2642 receives air from outside the ship 2010 through a first air intake conduit 2646. The first air outlet 2644 is used to discharge air from the fuel pump compartment 2040 to outside the ship 2010 through a first air discharge conduit 2648. The air from outside the ship 2010 enters the fuel pump compartment 2040 through the first air inlet 2642 without mixing with air from another compartment of the ship 2010 through.

The first air discharge conduit 2648 receives air from the first air outlet 2644 of the fuel pump compartment 2040 and transfer it to a first fuel leak detector 2650 which is installed at an end portion of the first air discharge conduit 2648. A first blower 2652 is installed at the end portion of the first air discharge conduit 2648 to generate an air flow from outside the ship 2010 to outside the ship 2010 through the first air intake conduit 2646, the fuel pump compartment 2040 and the first air discharge conduit 2648.

Referring to FIG. 21, in embodiments, the fuel processing compartment 2050 includes a second air inlet 2752 and a second air outlet 2754. The second air inlet 2752 receives air from outside the ship 2010 through a second air intake conduit 2756. The second air outlet 2754 is used to discharge air from the fuel processing compartment 2050 to the outside the ship 2010 through a second air discharge conduit 2758. The air from the outside the ship 2010 enters the fuel processing compartment 2050 through the second air inlet 2752 without mixing with air from another compartment of the ship 2010.

The second air discharge conduit 2758 receives air from the second air outlet 2754 of the fuel processing compartment 2050 and transfer it to a second fuel leak detector 2760 which is installed at an end portion of the second air discharge conduit 2758. A second blower 2762 is installed at the end portion of the second air discharge conduit 2758 to generate an air flow from outside the ship 2010 to outside the ship 2010 through the second air intake conduit 2756, the fuel processing compartment 2050 and the second air discharge conduit 2758.

Avoiding Transfer of Air in One Compartment to Another Compartment

In embodiments, further to air-tight partitioning between the fuel pump compartment 2040 and the fuel processing compartment 2050, the first and second air intake conduits 2648 and 2758 are separate from each other. Thus, air in the fuel pump compartment 2040 is not mixed with that in the fuel processing compartment 2050 through the first and second air intake conduits. Likewise, the first air discharge conduit 2648 and the second air discharge conduit 2758 are isolated from each other. Thus, air in the fuel pump compartment 2040 is not mixed with that in the fuel processing compartment 2050 through the first and second air discharge conduits. Above configurations are provided to avoid or minimize risk of transferring air between the fuel pump compartment 2040 and the fuel pump compartment 2040 through the conduits. In alternative embodiments, the first and second air intake conduits may be connected to an common intake conduit that receives air from outside of the ship and transfer the air to the first and second air intake conduits as long as air in the fuel pump compartment 2040 is not transferred to the fuel processing compartment 2050 through the first and second air intake conduits.

Leakage of Fuel in Compartments

In embodiments, the ship 2010 may include a controller which can stop the operation of the devices or components enclosed in the fuel pump compartment 2040 when the leak detector 2650 detects leakage of the fuel gas. Only the first blower 2652 is operated to circulate air and discharges leaked fuel gas from the fuel pump compartment 2040. Like the air circulation configuration for the fuel pump compartment 2040, the controller may stop the devices enclosed in the fuel processing compartment 2050 when the leak detector 2760 detects leakage of the fuel gas. Only the second blower 2762 is operated to circulate air and discharges leaked fuel gas from the fuel processing compartment 2050.

In embodiments, when the concentration of the fuel gas detected by the first detector is greater than a lower explosive limit (LEL, or lower flammability limit) of the fuel, the devices enclosed in the fuel pump compartment 2040 may be stopped by the controller or manually. In one embodiment, when the concentration of the fuel gas with respect to air is greater than a predetermined level which ranges about 30% to about 40%, the devices enclosed in the fuel pump compartment 2040 may be stopped by the controller or manually. Same or similar leakage conditions may be applied to the air circulation configuration for the fuel processing compartment 2050.

Location of Lubrication System

Referring to FIGS. 4 and 19, in embodiments, the lubrication pump and the secondary hydraulic motor are located in the fuel pump compartment 2040. The secondary hydraulic pump and the secondary electric motor are located in the hydraulic pump compartment 2060. Thus, the fuel pump 2112 and the hydraulic motor 2122 are air-tightly isolated from the secondary hydraulic pump and the secondary electric motor.

In the illustrated embodiments, lubricant conduits are enclosed in the fuel pump compartment 2040. Contrastingly, hydraulic fluid conduits connecting between the secondary hydraulic motor and the secondary hydraulic pump may extend through the air-tight partitioning wall between the fuel pump compartment 2040 and the hydraulic pump compartment 2060.

In other embodiments as shown in FIG. 5, the lubricant pump is located in the hydraulic pump compartment 2040. In the embodiments illustrated in FIG. 5, lubricant conduits connecting between the lubricant pump and the fuel pump 2112 module may extend through the air-tight partitioning wall between the fuel pump compartment 2040 and the hydraulic pump compartment 2060.

Heater and Vaporizer

Referring to FIG. 19, in embodiments, the heater 2114 includes a first heat exchanger which heats the pressurized fuel being transferred between the fuel pump 2112 and the supercritical fuel engine. The vaporizer 2130 includes a second heat exchanger that heats the fuel from the at least one fuel tank 2020 to change the fuel in a vaporized state.

The ship 2010 further includes a third heat exchanger 2150 and heat medium conduits. The first, second and third heat exchangers and the heat medium form a heat medium circuit in which a heat medium circulates. In one embodiment, the heat medium may be glycol water. In the heat medium circuit, the heat medium receives heat from another heat medium at the third heat exchanger. The other heat medium transfers heat from a heat source, for example, the MEGI engine 2030 or the DFDE engine 2035. At the first heat exchanger, the heat medium transfers heat to the pressurized fuel transferred from the fuel pump 2112 such that the temperature of the fuel is raised and the pressurized fuel becomes into a supercritical state. At the second heat exchanger, the heat medium transfers heat to the fuel from the fuel tank 2020 thereby vaporizing the fuel.

In embodiments, the first, second and third heat exchangers and the heat medium conduits are enclosed in the fuel processing compartment 2060. Thus, the fuel pump 2112 and the hydraulic motor 2122 are air-tightly isolated from the first, second and third heat exchangers.

It is apparent to those skilled in the art that the invention is not limited to the above embodiments and various modifications or variations can be made without departing from the scope of the invention.

What is claimed is:

1. A ship comprising:
at least one fuel tank containing fuel;
a fuel pump in fluid communication with the at least one fuel tank and configured to pressurize fuel from the at least one fuel tank to a pressure in a range from 150 bar absolute (bar(a)) to 400 bar(a);
a heater in fluid communication with the fuel pump and configured to heat pressurized fuel from the fuel pump to a supercritical state of the fuel;
a supercritical fuel engine in fluid communication with the heater and configured to consume the fuel from the heater in its supercritical state;
at least one hydraulic pump configured to convert mechanical power into a pressurized flow of a hydraulic fluid;
a first hydraulic motor in fluid communication with the at least one hydraulic pump and configured to convert the pressurized flow from the at least one hydraulic pump into torque to power the fuel pump;
a lubricant pump configured to pump lubricant to either or both of the fuel pump and the hydraulic motor;
a second hydraulic motor in fluid communication with the at least one hydraulic pump and configured to convert the pressurized flow from the at least one hydraulic pump into torque to power the lubricant pump;
hydraulic fluid conduits interconnecting the at least one hydraulic pump and the first and second hydraulic motors;
a fuel pump compartment comprising at least one air-tight wall and enclosing the fuel pump, the first hydraulic motor and the lubricant pump and the second hydraulic motor; and
at least one hydraulic pump compartment enclosing the at least one hydraulic pump,
wherein the fuel pump compartment is air-tightly separated from the at least one hydraulic pump compartment such that the fuel pump, the first hydraulic motor, the lubricant pump and the second hydraulic motor are air-tightly isolated from the at least one hydraulic pump.

2. The ship of claim 1, wherein the at least one hydraulic pump comprises a first hydraulic pump and a second hydraulic pump, which are enclosed in a single hydraulic pump compartment or in two separate hydraulic pump compartments, wherein the first hydraulic pump is in fluid communication with the first hydraulic motor via part of the hydraulic fluid conduits to form a first closed loop of hydraulic fluid, wherein the second hydraulic pump is in fluid communication with the second hydraulic motor via part of the hydraulic fluid conduits to form a second closed loop of hydraulic fluid.

3. The ship of claim 1, wherein the at least one hydraulic pump is a single hydraulic pump, wherein the at least one hydraulic pump compartment is a single hydraulic pump compartment, wherein the single hydraulic pump is in fluid communication with the first and second hydraulic motors via the hydraulic fluid conduits.

4. The ship of claim 1, further comprising lubricant conduits interconnecting between the lubricant pump and the fuel pump to form a closed loop of lubricant flow, wherein the lubricant conduits are enclosed in the fuel pump compartment.

5. The ship of claim 1, further comprising lubricant conduits interconnecting between the lubricant pump and the hydraulic motor to form a closed loop of lubricant flow, wherein the lubricant conduits are enclosed in the fuel pump compartment.

6. The ship of claim 1, wherein the hydraulic fluid conduits extend between the fuel pump compartment and the at least one hydraulic pump compartment through the at least one air-tight wall of the fuel pump compartment.

7. The ship of claim 1, further comprising an electric motor configured to generate mechanical energy to power the at least one hydraulic pump for pumping of hydraulic fluid in the at least one hydraulic pump, wherein the electric motor is integrated with the at least one hydraulic pump and enclosed in the at least one hydraulic pump compartment.

8. The ship of claim 1, wherein the fuel pump and the hydraulic motor enclosed in the fuel pump compartment are built in an integrated body, wherein the lubricant pump configured to pump lubricant to the integrated body.

9. The ship of claim 1, further comprising a hydraulic fluid container enclosed in the at least one hydraulic pump compartment and in fluid communication with the at least one hydraulic pump.

10. The ship of claim 9, further comprising a hydraulic fluid drain conduit interconnecting the first hydraulic motor and the hydraulic fluid container, wherein the hydraulic fluid drain conduit extends between the fuel pump compartment and the at least one hydraulic pump compartment.

11. The ship of claim 1, wherein the supercritical fuel engine comprises an M-type Electronic Gas Injection (MEGI) engine.

12. The ship of claim 1, further comprising a fuel processing compartment enclosing the heater such that the pressurized fuel travels from the fuel pump compartment to the fuel processing compartment and is heated within the fuel processing compartment, wherein the fuel pump compartment is air-tightly separated from the fuel processing compartment by the at least one air-tight wall such that the fuel pump and the first hydraulic motor are air-tightly isolated from the heater.

13. The ship of claim 1, wherein the fuel pump compartment comprises multiple air-tight walls and enclosing the fuel pump, the first hydraulic motor and the lubricant pump and the second hydraulic motor.

14. An apparatus for supplying a fuel to an engine of a ship, the apparatus comprising:
a high pressure pump configured to pressurize liquefied natural gas (LNG);
a heater in fluid communication with the high pressure pump and configured to heat pressurized LNG from the high pressure pump for supplying to the engine;
a hydraulic motor configured to drive the high pressure pump;
a lubricating pump configured to supply lubricating oil to the high pressure pump: and
a first hydraulic power unit and a second hydraulic power unit configured to supply oil to the hydraulic motor, the second hydraulic power unit being configued to operate when the first hydraulic power unit is not operable,
wherein the first hydraulic power unit is connected to the hydraulic motor by a first hydraulic line on which a first shutdown valve is installed,
wherein the second hydraulic power unit is connected to the hydraulic motor by a second hydraulic line on which a second shutdown valve is installed, and
wherein the first shutdown valve is opened in the case in which the first hydraulic power unit is operated and the second shutdown valve is opened in the case in which the second hydraulic power unit is operated.

15. The apparatus of claim 14, further comprising a lubricating motor configured to drive the lubricating pump.

16. The apparatus of claim 15, further comprising third and fourth hydraulic power units configured to supply oil to the lubricating motor,
wherein the fourth hydraulic power unit is configured to operate when the third hydraulic power unit is not operable.

17. The apparatus of claim 16, wherein the third hydraulic power unit is connected to the lubricating motor by a third hydraulic line on which a third shutdown valve is installed,
wherein the fourth hydraulic power unit is connected to the lubricating motor by a fourth hydraulic line on which a fourth shutdown valve is installed, and
wherein the third shutdown valve is configured to open in the case in which the third hydraulic power unit operates, and the fourth shutdown valve is configured to open in the case in which the fourth hydraulic power unit operates.

18. The apparatus of claim 15, further comprising a hydraulic power unit configured to supply oil to the hydraulic motor and the lubricating motor.

19. The apparatus of claim 18, wherein the hydraulic power unit is connected to the lubricating motor by a hydraulic line on which a pressure regulating valve is installed, and the pressure regulating valve is a valve configured to regulate an amount of oil supplied to the lubricating motor.

* * * * *